(12) United States Patent
Smith-Mickelson et al.

(10) Patent No.: US 12,107,819 B1
(45) Date of Patent: Oct. 1, 2024

(54) COMMUNICATIONS APPARATUS AND METHOD USING CHANNEL-COMMUNICATIONS MANAGEMENT WITH INTELLIGENT ACCESS TO PERIPHERAL RESOURCES

(71) Applicant: 8×8, Inc., Campbell, CA (US)

(72) Inventors: Jared Smith-Mickelson, Campbell, CA (US); Bryan R. Martin, Campbell, CA (US)

(73) Assignee: 8×8, Inc., Campbell, CA (US)

( * ) Notice: Subject to any disclaimer, the term of this patent is extended or adjusted under 35 U.S.C. 154(b) by 0 days.

(21) Appl. No.: 17/990,208

(22) Filed: Nov. 18, 2022

(51) Int. Cl.
*H04L 51/56* (2022.01)
*H04L 51/216* (2022.01)

(52) U.S. Cl.
CPC ............ *H04L 51/56* (2022.05); *H04L 51/216* (2022.05)

(58) Field of Classification Search
CPC ....... H04L 51/216; H04L 51/56; H04L 51/04; H04L 51/046; H04L 51/52; H04L 51/42; H04L 51/066; H04L 51/58; G06Q 10/107; H04W 4/12
See application file for complete search history.

(56) References Cited

U.S. PATENT DOCUMENTS

| | | | | |
|---|---|---|---|---|
| 6,829,478 B1 * | 12/2004 | Layton | ................ | G08B 25/004 370/242 |
| 8,340,580 B1 * | 12/2012 | Epstein | ................. | H04B 1/406 455/73 |

(Continued)

FOREIGN PATENT DOCUMENTS

| | | |
|---|---|---|
| WO | 2022/240433 A1 | 11/2022 |
| WO | 2022/256028 A1 | 12/2022 |

OTHER PUBLICATIONS

TheSandWraith: How to merge iOS messages conversation feed? Apple Inc., https://discussions.apple.com/thread/6566339, 4 pages (Sep. 27, 2014).

(Continued)

*Primary Examiner* — Ninos Donabed
(74) *Attorney, Agent, or Firm* — Crawford Maunu PLLC

(57) ABSTRACT

In one example, a communications system includes a unified communications server platform (UCP) and processing circuitry including a channel-communications management module. The unified communications platform is to process different types of communications services, for a data-communications service provider, respectively using different types of communications channels. The channel-communications management circuit (CCMC) manages in real-time communications involving the UCP and provides effective merging of two or more inbound data communications received via the different types of communications channels for effecting a streamlined-single communication channel via a graphic user interface (GUI) accessible to a user of the communications services. A processing circuit is communicatively integrated with the CCMC to assess the two or more inbound data communications and in response to provide, as one of the communications services from the UCP and via the GUI, peripheral data deemed by the processing circuit as advantaging the streamlined-single communication channel for review to the user.

21 Claims, 8 Drawing Sheets

(56) References Cited

U.S. PATENT DOCUMENTS

| | | | |
|---|---|---|---|
| 8,917,855 B1* | 12/2014 | Narayanaswamy | H04M 7/006 379/265.09 |
| 9,727,862 B2* | 8/2017 | O'Connell | G06Q 20/4014 |
| 10,135,775 B1* | 11/2018 | Givol | G07G 1/01 |
| 10,225,075 B1* | 3/2019 | Moritz | H04L 9/0827 |
| 10,552,601 B2* | 2/2020 | Kilpatrick | H04L 9/3236 |
| 10,623,506 B2* | 4/2020 | McFadden | H04L 67/51 |
| 10,657,225 B2* | 5/2020 | Kilpatrick | H04L 67/51 |
| 10,664,910 B1* | 5/2020 | Koshet | H04L 63/102 |
| 10,754,989 B2* | 8/2020 | Baset | G06F 11/1482 |
| 11,032,282 B2* | 6/2021 | Revanur | H04L 63/10 |
| 11,032,362 B2* | 6/2021 | Nguyen | H04L 67/1031 |
| 11,295,837 B2* | 4/2022 | Mangesius | G16H 20/00 |
| 11,425,252 B1* | 8/2022 | Martin | H04M 3/5141 |
| 11,477,144 B1* | 10/2022 | Yasnoff | H04L 51/56 |
| 11,522,726 B1* | 12/2022 | Alwar | H04L 67/288 |
| 11,588,620 B2* | 2/2023 | White | H04L 9/3297 |
| 11,611,527 B1* | 3/2023 | Oliveira | H04L 51/214 |
| 11,611,560 B2* | 3/2023 | Padmanabhan | H04L 63/102 |
| 11,616,752 B1* | 3/2023 | Seok | H04W 4/14 709/206 |
| 11,616,816 B2* | 3/2023 | Cage | G06F 16/2379 726/1 |
| 11,671,393 B2* | 6/2023 | Givol | G07G 1/01 709/206 |
| 11,799,814 B1* | 10/2023 | Hassan | H04L 51/046 |
| 2003/0055974 A1* | 3/2003 | Brophy | H04L 65/401 709/227 |
| 2004/0143428 A1* | 7/2004 | Rappaport | H04L 41/12 703/22 |
| 2006/0212846 A1* | 9/2006 | O'Farrell | H04L 67/01 717/116 |
| 2007/0208442 A1* | 9/2007 | Perrone | G05D 1/0088 700/95 |
| 2008/0086564 A1 | 4/2008 | Putman et al. | |
| 2009/0112875 A1 | 4/2009 | Maes | |
| 2009/0217329 A1* | 8/2009 | Riedl | H04N 21/4788 725/93 |
| 2010/0180001 A1* | 7/2010 | Hardt | H04L 12/189 715/752 |
| 2010/0251230 A1* | 9/2010 | O'Farrell | G06F 16/27 717/173 |
| 2011/0004637 A1* | 1/2011 | O'Farrell | G06F 16/25 707/809 |
| 2011/0046960 A1 | 2/2011 | Spier et al. | |
| 2011/0213785 A1* | 9/2011 | Kristiansson | G06Q 10/10 707/748 |
| 2011/0313921 A1* | 12/2011 | Dheer | G06Q 40/02 705/42 |
| 2012/0008753 A1* | 1/2012 | Burnett | H04L 51/56 379/90.01 |
| 2013/0097526 A1* | 4/2013 | Stovicek | G06Q 10/107 715/752 |
| 2013/0303267 A1* | 11/2013 | Vasquez | G06Q 50/01 715/741 |
| 2014/0006930 A1* | 1/2014 | Hollis | G06Q 50/01 715/234 |
| 2014/0100848 A1 | 4/2014 | Shaffer et al. | |
| 2014/0282851 A1* | 9/2014 | Miller | H04L 67/75 726/1 |
| 2015/0039600 A1* | 2/2015 | Walters | G06Q 10/06 707/725 |
| 2015/0295879 A1* | 10/2015 | Jung | H04L 51/52 709/204 |
| 2016/0095056 A1 | 3/2016 | Lebon-schneider et al. | |
| 2016/0216130 A1* | 7/2016 | Abramson | G01C 21/3423 |
| 2016/0227035 A1 | 8/2016 | Kumar et al. | |
| 2016/0261489 A1* | 9/2016 | Knees | H04L 41/0213 |
| 2016/0299860 A1* | 10/2016 | Harriman | G06F 13/4282 |
| 2016/0350747 A1* | 12/2016 | Pruthi | G06Q 20/108 |
| 2016/0350748 A1* | 12/2016 | Pruthi | H04L 63/061 |
| 2017/0006161 A9 | 1/2017 | Riahi et al. | |
| 2017/0078259 A1* | 3/2017 | Kumar | G06Q 40/02 |
| 2017/0244934 A1* | 8/2017 | Chien | H04N 7/183 |
| 2017/0279957 A1* | 9/2017 | Abramson et al. | G06F 21/36 |
| 2018/0114169 A1* | 4/2018 | Wiig | G06N 5/048 |
| 2018/0157618 A1* | 6/2018 | Ritter | G05B 19/056 |
| 2018/0199383 A1* | 7/2018 | Au Yeung | H04L 67/55 |
| 2018/0270317 A1* | 9/2018 | Feng | H04L 67/55 |
| 2018/0315000 A1 | 11/2018 | Kulkarni et al. | |
| 2019/0014149 A1* | 1/2019 | Cleveland | G06N 3/045 |
| 2019/0053238 A1* | 2/2019 | Zeng | H04L 1/00 |
| 2019/0238525 A1* | 8/2019 | Padmanabhan | H04L 63/0428 |
| 2019/0272085 A1* | 9/2019 | Radhakrishnan Lakshmi | G06F 3/0486 |
| 2019/0303621 A1* | 10/2019 | Baset | G06F 11/1479 |
| 2020/0134656 A1* | 4/2020 | Padmanabhan | H04L 9/0637 |
| 2020/0213251 A1* | 7/2020 | Shah | G06N 20/00 |
| 2020/0396195 A1* | 12/2020 | Goel | H04L 51/58 |
| 2021/0126983 A1* | 4/2021 | Bellet | G06Q 10/101 |
| 2021/0201354 A1* | 7/2021 | Maliszewski | G06Q 30/0244 |
| 2021/0287274 A1* | 9/2021 | Nguyen | G06N 3/04 |
| 2021/0357954 A1* | 11/2021 | Mousset | G06Q 30/0207 |
| 2022/0245044 A1* | 8/2022 | Mabry | G06F 11/3051 |
| 2022/0311727 A1* | 9/2022 | Agarwal | H04L 51/214 |
| 2022/0327009 A1* | 10/2022 | Beard | G06F 12/023 |
| 2022/0383405 A1* | 12/2022 | Head | H04L 51/216 |
| 2023/0063525 A1* | 3/2023 | Fernandes | B61L 15/0027 |
| 2023/0403249 A1* | 12/2023 | Hassan | H04L 51/216 |

OTHER PUBLICATIONS

Alex Heath. Merge Clears Up Confusion by Combining iMessages From Multiple Device IDs Right In iOS [JailbreakCon]. https//www.cultofmac.com/category/news/, 9 sheets (Sep. 29, 2012).

8×8, "8×8 Work", https://www.8x8.com/products, downloaded Jul. 2023.

8×8 Admin Console, "Set up call park extension." 8×8, Inc. (2022), 1 sheet. https://docs.8x8.com/8x8WebHelp/admin-console/Content/Set_up_Call_Park_Extension.htm.

8×8, "8×8 Frontdesk", https://www.8x8.com/products/business-phone/frontdesk, downloaded Apr. 25, 2023.

USPTO. International Search Report and Written Opinion (ISR) dated Dec. 1, 2021, received for International Patent Application No. PCT/US2021/048215 of the common Applicant, 13 pages.

USPTO. International Search Report and Written Opinion (ISR) dated Dec. 1, 2021, received for International Patent Application No. PCT/US2021/048238 of the common Applicant, 8 pages.

Applicant, 8×8, Inc. provides data-communication offerings, including products and services that are identifiable by way of the company website (www.8x8.com), and which offerings concern background information and possibly also prior art which the Examiner may deem somewhat relevant to the instant application. No attachment.

\* cited by examiner

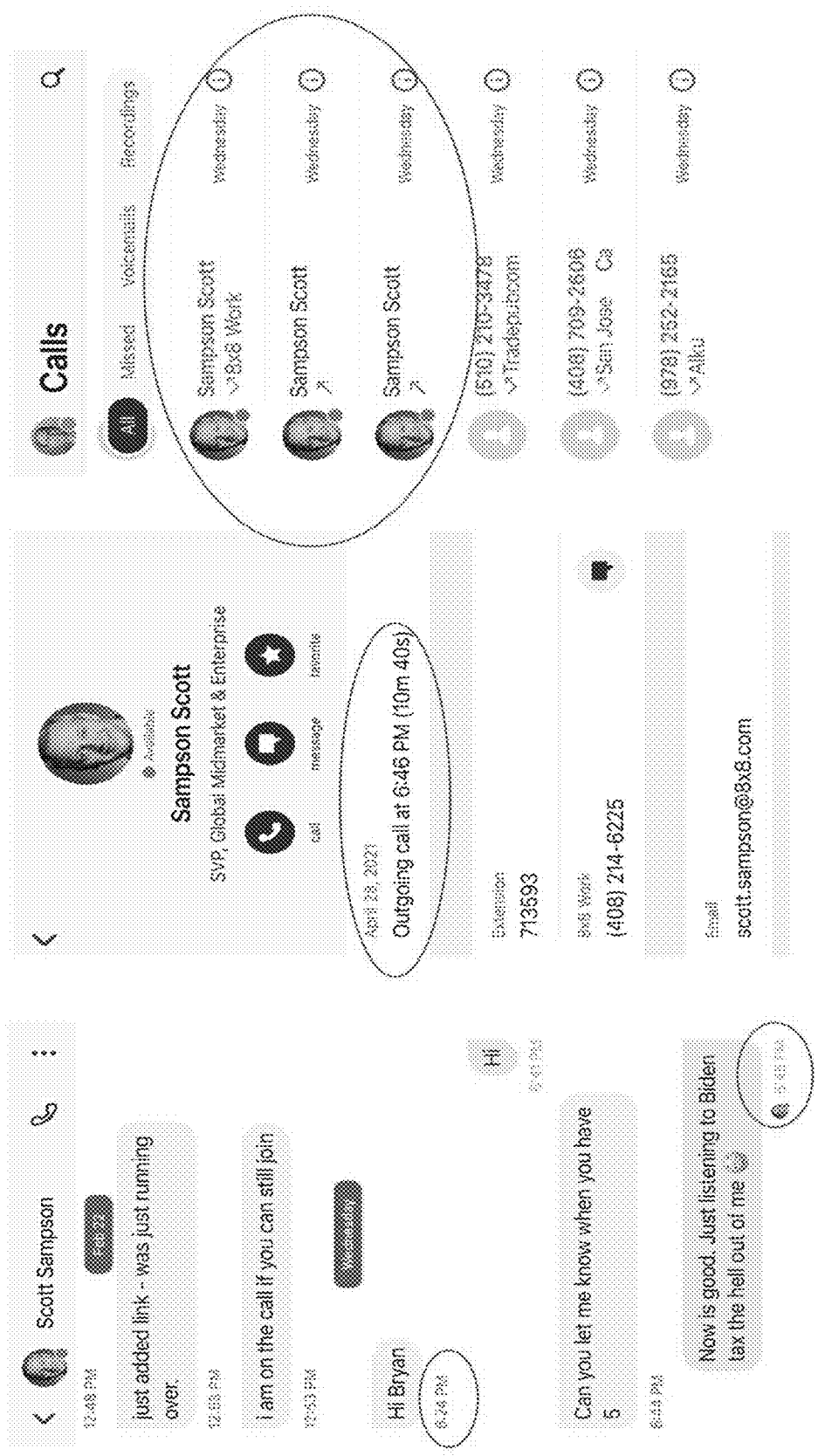
FIG. 2C: Example issue overcome by unification of channels in 8x8 Word-D/Work-M
Raw data is in Word-D/Work-M for phone and messaging, but the call logs are flat and there is no connection between phone and messaging events

COMMUNICATIONS APPARATUS AND METHOD USING CHANNEL-COMMUNICATIONS MANAGEMENT WITH INTELLIGENT ACCESS TO PERIPHERAL RESOURCES

OVERVIEW

Aspects of the present disclosure are generally directed to data-communications and computer servers.

Computer servers are increasingly being used to provide various services over a network including, but not limited to, VoIP communications services such as VoIP calls, video conferencing, call exchange servers, packet switching, and traffic management as well as non-VoIP services including, but not limited to: website hosting, remote data storage, remote computing services, and virtual computing environments.

The use of data communications services has been widespread and significant in terms of both numbers of users and types of services/systems being made available. This growth could be attributable to any of a wide variety of socio-economic changes such as the mobility of users of these services, the types and reduced costs of portable telecommunication tools, and the ever-evolving technology adapting to the personal and business needs of the communications users. Due to wide-spread needs of such users and the many disparate types of services/systems being made available, cohesive integration of such services/systems for secure and efficient operations has been problematic. Consequently, users attempting to utilize such systems have experienced difficulty and oftentimes significant delay and frustrations when these systems have attempted to intercept the user communications. For example, these experiences often ensue from auto-attendant processors attempting unsuccessfully to discern the reasons for users having called a certain entity (e.g., via an audio-type or text-type communication).

In connection with the widespread use of data communications services, there have been a number of reports that user-data, provided for being processed solely by data-service providers, has been conveyed to third parties without permission being granted by the users and/or the users' understanding of the extent of the data being shared. Because users may receive benefit from having some of their personal data shared with third parties, implementing appropriate levels of control over this type of sharing has proven difficult. While certain sites and search engines oftentimes attempt to address this apparent tension by way of permission-providing queries, this approach can be confusing and overly complex especially when users and conveying such sensitive data on many disparate types of services/systems.

Accordingly, there is need for improvement in terms of data communications methods and systems for users engaging disparate types of services/systems.

SUMMARY

Various example embodiments are directed to issues such as those addressed above and/or others which may become apparent from the following disclosure concerning systems and methods involving data-communications systems configured to provide data services by way of disparate types of communications channels and/or processing and routing of users' communications.

Other particular examples and related aspects are directed to circuitry as part of a data-communications system, wherein such circuitry includes one or more servers implemented as a unified communications service platform to provide communications services over different types of communications channels that are used for certain inbound communications received over the different channel types, and wherein the received communications are effectively merged into an interaction record. In certain examples, the interaction record is used for ongoing or further communications by the user or for reviewing user communications by the user or by a supervisor of a client entity to which both the user and supervisor are linked.

In another specific example of the present disclosure, a similarly-configured system is configured to assess the data communications on the different channel types and, in response, to provide as one of the communications services, peripheral data deemed by the processing circuit as likely concerning or advantaging the streamlined-single communication channel for review by the user and/or, in certain instances, training of AI/ML processing engines which the system may have configured to learn from an aggregation of past and ongoing attributes of such data communications.

In yet other specific examples which are related to and which may build on one or more of the above aspects, aspects are directed to a data communications system including a unified communications server platform (UCP) and processing circuitry, wherein the processing circuitry includes a channel-communications management module. The unified communications platform is to process different types of communications services, on behalf a data-communications service provider, respectively using different types of communications channels. The channel-communications management circuit (CCMC) manages in real-time communications involving the UCP and provides an effective merging of two or more inbound data communications received via the different types of communications channels for use in effecting a streamlined-single communication channel via a graphic user interface (GUI) accessible to a user of the communications services. A processing circuit is communicatively integrated with the CCMC to assess the two or more inbound data communications (by use of analytics circuitry) and in response to provide as one of the communications services from the UCP and via the GUI, peripheral data deemed by the processing circuit as likely concerning and/or advantaging the streamlined-single communication channel for review to the user. In various more-specific examples, the peripheral data is generated via an analytics engine which is internal and privately managed by the service provider for which the data-communications system is being managed and in other instances, the peripheral data is provided based on data generated by a third-party computing engine in response to the engine receiving (from the data communications system) data which is relevant to the real-time call occurring in the stream-lined communication channel.

In certain other examples which may also build on one or more of the above aspects, the present disclosure is directed to processing circuit, as part of the data communications system, wherein the processing circuit includes an analytics circuit to identify a topic that is common to each of the two or more inbound data communications and to access a user profile, linked to the user, before providing the peripheral data concerning the streamlined-single communication channel to the user for review. The analytics circuit may be configured to identify a topic that is common to each of the two or more inbound data communications and to access a database of historic communications involving an entity linked to or including the user, before providing the peripheral data concerning the streamlined-single communication channel to the user for review.

In connection with further related aspects which may be used to build on one or more of the above systems and/or methods, the analytics circuit may also be configured to access a database of different peripheral-data categories or types and to select a subset of the different peripheral-data categories or types for providing the peripheral data concerning the streamlined-single communication channel to the user for review. The database may store different types of communications services offered by the platform and the analytics circuit may select a subset of these services for providing, for review to the user, peripheral information concerning the subset of the different types of communications services.

The following characterizes yet further related aspects which may be used to build on one or more of the above systems and/or methods. In one specific example, such a communications system includes a processing circuit with an analytics circuit to access a database of different peripheral-data categories or types among which at least some include information for identifying third-party resources, and the processing circuit selects a subset of the different peripheral-data categories or types and to provide the peripheral data along with a selected one of the identified third-party resources, to the user for review. As another such example, the processing circuit may be configured to assess that the selected one of the identified third-party resources is deemed likely to concern the streamlined-single communication channel, and/or satisfy threshold established in a user profile that is linked to the user, and wherein the threshold is adjustable within the user profile by an administer acting on behalf of the user. The processing circuit may also be configured to provide the peripheral data, via a GUI, by using a type of communications channel that is, in one example, common to one of the different types of communications channels for use in effecting the streamlined-single communication and in another example, different than one of the different types of communications channels for use in effecting the streamlined-single communication.

According to other aspects, the present disclosure is directed to specific uses of a data-aggregation circuit in combination with a data-analytics circuit. In one specific example, these circuits are to collect and aggregate information corresponding to digital data carried over the different types of communications channels, and to assess contexts of the collected and aggregated information before providing the peripheral data concerning the streamlined-single communication channel for providing specific forms of information as output. In more specific examples, this output may be presented to a user and/or as the feedback to these same circuits for review and related purposes such as machine-learning training, user-related training, self-assessment, various ways to improve communications in context relating to the assessed information, to identify a relationship between the streamlined-single communication channel and/or a topic in the aggregated information, and to select certain peripheral data concerning the streamlined-single communication channel (e.g., based at least in part on the identified relationship or topic).

In connection with certain applications of the above-described systems and methods, the received digital data can be advantageously captured and analyzed for use by a call-routing engine (e.g., internal to the platform), and the incoming interactions may be discerned and/or resolved by the system effecting call-decision routing of the calls to designated call-center agents or specialists (e.g., subject matter experts) having specific knowledge of the matter(s) relating to the discerned incoming interactions. For example, by aggregating data associated with client entities and/or end users and in some instances accessing related (e.g., internal or externally-provided) channel feeds, an integration of data-analytics and call-decision processing is used to identify and direct an outcome of such inquiries even if the inquiries are received via relatively rudimentary audio conversations through an auto attendant, thereby permitting users behind the respective incoming interactions an efficient and non-frustrating automated self-service experience.

In other examples tied to certain applications according to the present disclosure, certain systems and methods process the received digital data by way of a computing processor which may have two (functional if not also physical) analytics-based modules. The first module analyzes data aggregated from data communications which are processed (e.g., routed) by the data communications system in order to identify particular attributes of such communications (e.g., topic, context, individual names). The particular attributes are identified so that the system might take advantage of understanding and at least predicting what resources might be made available, via one or more GUIs to advantage participants of the data communications. Such resources (e.g., bridging another party into the call, bringing up historical data regarding the topic, context, individual names, directing one or more call participants to a link which is relevant for answering a question raised in the call) may be provided as feedback to the call participant(s) via a channel which feeds a related GUI (via a channel feed). The second module, which may be internal (e.g., managed by the service provider) or a channel feed which is externally provided from a third-party resource, may be used as a supplemental resource (e.g., operating in parallel to such operations of the first module and/or operating in a subservient manner in situations when the first module or processing circuit requests such supplementation and a client-entity profile provides permission for the system to send a query to the second module (e.g., external to the system) along with one or more particular attributes of the call.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in the accompanying drawings, in which example aspects and embodiments are illustrated, each according to the present disclosure, as follows:

FIGS. 2B, 2C, and 2D illustrate examples (issues and solutions) in which a data-communications system, such as shown in FIGS. 1A, 1B and/or 2A, may operate with aspects consistent with each of the above example embodiments.

Figure 1A:
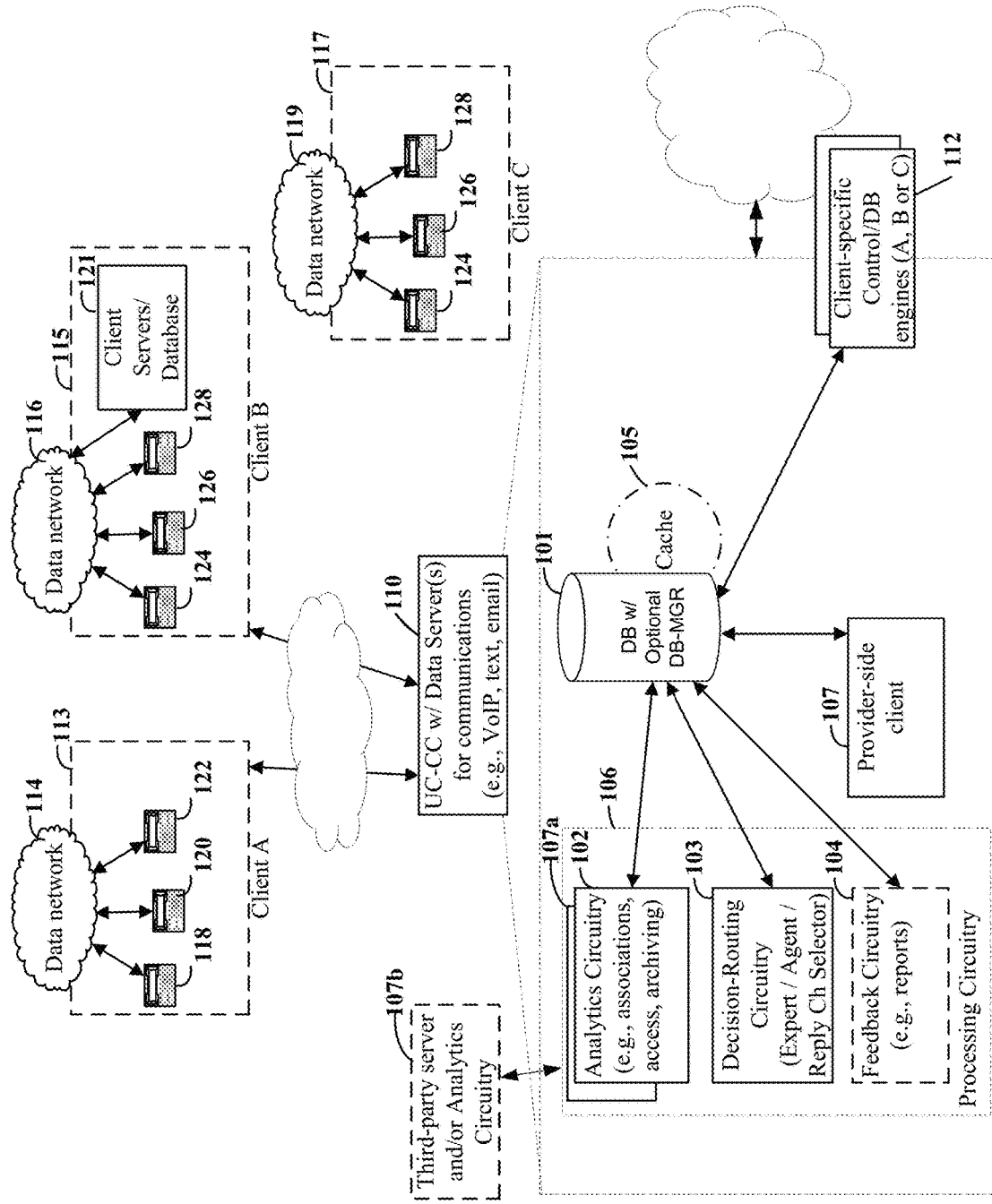
FIG. 1A illustrates an example data-communications system.

While various embodiments discussed herein are amenable to modifications and alternative forms, certain aspects thereof are shown by way of example in the drawings and described in detail herein. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses and methods concerning provision of digital-communications services and systems involving decisions to route incoming calls (or "interactions") and processing and analysis of the same, whether as voice, text, email data, etc. In certain implementations, aspects of the present disclosure have been shown to be beneficial when used in a PaaS- or SaaS-type communications platform having a set of one or more servers providing data communications services to remotely-situated client entities via broadband networking as oftentimes includes the Internet (PaaS and SaaS are short for Platform as a Service and Software as a Service). While the present disclosure is not necessarily limited to these types of exemplary communications systems, for purposes of facilitating understanding and appreciation of certain embodiments, the following discussion uses such services and systems in the context of a service-provider data-communications platform providing communications to different client entities which subscribe to such services as may be offered from a service-provider which manages and/or operates the PaaS/SaaS platform(s).

In one specific example, a data communications system is implemented as a unified communications platform (including a variety of cloud-interconnected servers) and includes a channel-communications management circuit that is communicatively integrated with the unified communications platform. The platform processes different types of communications services respectively using different types of communications channels, and the channel-communications management circuit provides an effective merging of inbound data communications received via the different types of communications channels to develop an interaction record for a reply communication on a preferred channel and/or for use in a subsequently-received inbound data communication. In more specific examples, content in the interaction record may recognized and enhanced with data from an external resource (e.g., from an internally- or externally-provided resource based on attributes derived from the content).

In certain other related examples, certain example embodiments of the present disclosure are directed to a data-communications system for enabling a plurality of user-endpoint devices to communicate data over a broadband network and each of the plurality of user-endpoint devices having circuitry to communicate over the broadband network. In one such data-communications system using a broadband network involving a set of connected networks (e.g., Internet alone or in combination with another public/private network) the system may include a server arrangement including CPU-processing circuitry, a CPU server and a channel-communications management circuit. The server arrangement may be configured to provide a unified communications platform for facilitating different types of communications services over the broadband network and over different communications channels by communicating data on behalf of users of the user-endpoint devices. The channel-communications management circuit may be configured to operate on behalf of each of the users of the user-endpoint devices. This operation may be achieved by: merging data communications received by the server arrangement over the different communications channels into a unification channel specifically associated with the user (said each of the users); and/or selecting one of the different communications channels, based on a preference-priority feed (or feed channel) and/or on an analysis by an AI/ML process of the communication itself (e.g., content, sender, participant, trigger words, aspects specified in a user profile, etc.), in response to a request for a follow-up communication after the user receives an inbound interaction via the server arrangement. In this manner, the selected one of the different communications channels may be input to and used by the system (or server arrangement) to create a unified interaction record (e.g., across different types of sometimes disparate communications channels) and/or in the system which determines over which of the different communications channels the follow-up communication is to be conveyed.

The processing circuitry in this type of communications system may include an analytics circuit (or module) to access a database of different peripheral-data categories or types among which at least some include information for identifying third-party resources, and the processing circuit selects a subset of the different peripheral-data categories or types and to provide the peripheral data along with a selected one of the identified third-party resources, to the user for review. As another such example, the processing circuit may be configured to assess that the selected one of the identified third-party resources is deemed likely to concern the streamlined-single communication channel, and/or satisfy a threshold established in or associated with a user profile that is linked to the user involved in the streamlined communications, and wherein the threshold is adjustable within the user profile by an administer acting on behalf of the user. The processing circuit may also be configured to provide the peripheral data, via a GUI, by using a type of communications channel that is, in one example, common to one of the different types of communications channels for use in effecting the streamlined-single communication and in another example, different than one of the different types of communications channels for use in effecting the streamlined-single communication.

Also according to the present disclosure, another specific example is directed to addressing the use of data communications services which has sometimes led to the concern that sensitive data at the user's data-service providers may be conveyed to one or more third-party-managed engines without consent of the user. When the user (or client-entity) is the paying recipient of such communications services, this situation can create problems and to the extent that certain permission has been granted for certain types of communications, it is not always clear to what extent and in which if any particular situations the communications-services provider may be permitted to involve a third party for assisting the user. In one example aspect, the present disclosure is directed to use of the data communications system having a user-configurable user profile to manage a first analytics engine (e.g., internal to the data communications system) for controlling an extent to which sensitive user information may be passed from the system to another (second) analytics engine, where presentation of possibly user-sensitive attributes (or types of information) relating to the call might by misused by the second analytics engine.

The above examples and aspects (and those to be disclosed below) may be used in a variety of combinations as should be apparent, particularly in view of a communications system having unified communications platform as further described below, whereby the system is configured to recognize related inbound communications and in response to effectively merge the communications (e.g., in summary form or as a whole) from the different channels into an interaction record for convenient and effective uses such as for replies in answering or reacting to subsequent inbound communications which are expected to relate to the interaction record based on, as examples, one or more of common participant(s), and time and/or subject matter discerned as being common to such a subsequent inbound communication and to the interaction record. As such, it will be appreciated that any of a number of different types of communications systems may be used in connection with specific embodiments, whether or not any one type is specific to such a unified communications platform.

Other aspects may be used to build on the above aspects of such a data-communications system, including those in the following discussion. The data-communications system may have the channel-communications management circuit configured so as to be co-located at the same site as the server arrangement, and/or wherein the channel-communications management circuit and the server arrangement are to use a common broadband router, or network gateway, to access data over the broadband network. Also, the channel-communications management circuit and the server arrangement may be managed or operated on behalf of a common service provider which is situated to provide communications services to the remotely-located end users or client entities (e.g., via servers specific to respective ones of the client-entities as in a virtual private branch exchange arrangement). Further, the follow-up communication may be a reply communication designated to be returned by the server arrangement to a sender or participant of the inbound interaction, and/or the follow-up communication may be a forward communication, related in subject matter context to the inbound interaction, designated to be forwarded by the server arrangement to one or more designated recipients.

Also as with the above aspects, other optional and/or alternative features may be used to build on the above type of data-communications system. For example, the data-communications system may have the merging data communications received by the server arrangement over the different communications channels into a unification channel specifically associated with the user and this may include linking and organizing the data communications for access by and/or presentation to the user. As another example, the preference-priority feed may refer to or include data stored in a settings profile and which data is configurable by or on behalf of the user.

In further aspects, the processing circuitry may be configured (e.g., programmed) to discern a subject matter context of the inbound interaction and, in response, to execute an AI/ML algorithm. In this regard, the preference-priority feed refers to or includes data output from the algorithm operative based on a database including historical information related the discerned subject matter context. Also, the processing circuitry may be configured to use an AI/ML algorithm having access to data stored in a settings profile which data is configurable by or on behalf of the user and to data previously aggregated based on other inbound interactions received and processed by the server arrangement.

In another optional/alternative aspect, the data-communications system may further include a clientele-specific correlation database, wherein for a plurality of inbound interactions in addition to the server arrangement processing the aforesaid inbound interaction, the processing circuitry may to discern subject matter contexts and, in response, aggregate and store data associated therewith in the clientele-specific correlation database. The database may be used to correlate or link one or more of the discerned subject matter contexts with the user or the unification channel specifically associated with the user.

Also the above server arrangement may be configured to receive another inbound interaction designated for the user by accessing a clientele-specific correlation database for assisting in the selection of one of the different communications channels.

In certain examples, the above-noted preference-priority feed may refer to or include and use one or more of data from a database with configurable preferences or with configurable priorities; a data source fed by outcomes of an AI/ML process; a settings profile configurable by an administrator for the communications services; and third-party data resources designated by the user or by an administrator for the communications services. Alternatively, the preference-priority feed may refer to or include control data with configurable preferences, priorities and/or restrictions, said control data being provided by an administrator for the communications services.

The above variations of the data-communications system might be best understood in the context of one example of a data-communications system based on (or including) a platform that integrates operations associated with a unified-communications (UC) and a call center (CC). The platform, which may be referred to as a UC-CC platform, includes a memory circuit having a database of information sets and includes a computer circuit to receive and process incoming data-communication interactions ("incoming interactions") and these incoming interactions may be any of among a variety of different types of digitally-represented communications such as incoming VoIP (Voice over Internet Protocol) calls, SMS or texts communications, emails, etc.). The memory circuit is integrated with the UC-CC platform, and each of the information sets includes experience data which represents aspects of past incoming data-communication interactions processed by the unified-communications and call center platform. Each of the information sets may also have data aggregated and organized based on data collected in response to previous ones of the incoming interactions.

The UC-CC platform may be integrated with the memory circuit to respond to a respective one of the incoming communications and interactions by: accessing the database, through reads from and/or writes to at least one of the information sets associated with the respective one of the incoming interactions; utilizing the data from past interactions and at least one other data source; and facilitating, in response to the utilization of the data and to the access of the database, an automated self-service experience for respective users or originators of the incoming interactions through the automated processing. The automated self-service experience may be configured such that the experience includes at least one of resolution of inquiries discerned through the incoming interactions; and call-decision routing of the incoming interactions to designated call-center agents or specialists having specific knowledge of subject matter discerned through the incoming interactions.

With the effective merging of different communications from different channel types into an interaction record, the skill/knowledge level of the caller may be discerned and/or the system by use of a data analytics module for a more particular selection of the designated call-center agents or specialists having such knowledge, and/or may be used by the designated call-center agents or specialists to serve the caller in a more intelligent manner. Similarly, the types of channels used by a caller may also be used by the system or the data analytics module. Consider, for example, respective callers associated with sequential calls reflecting: a lack of general familiarity with an entire product line as initially conveyed on a chat channel, and increasingly detailed questions about a do-it-yourself (DIY) reparation of a particular product as later conveyed on an email channel and then on a VoIP channel. In this latter case, the selection of the designated call-center agents or specialists may require a more particular selection of a specialist who has the requisite level of expertise regarding such DIY reparation of the particular product.

Also in accordance with examples of the present disclosure, the data-communications system may be configured such that users of the system can use a plurality of communications services to communicate with clients and other professionals and to carry out various tasks. For example, agents of a client entity can use a private network application to generate work products, a cloud-based application to manage service issues, another cloud-based application to manage direct communications such as email and chat messages, and yet another cloud-based application to manage financial matters such as billing and invoicing. In many instances, it can be beneficial for a subscribed entity or that uses the data-communications system to analyze audio and text conversations of its endpoint devices (e.g., smartphones, user-based CPUs, etc.) (or in some instances spanning users of other entities as well) to improve subsequent interactions with the client or professional.

For example, a virtual assistant or intelligent personal assistant can be used to improve and/or supplement communications with clients (e.g., customers). As used herein, a virtual assistant refers to or includes a dynamic series of inquiries provided to, and associated responses received from, a sender or participant of a data communication (such as a customer of a client entity). A virtual assistant can be used to supplement and/or replace a live telephone conversation between the parties, and can in many instances improve the services provided to the client (e.g., customer). In some instances, the term "chatbot" is used to refer to a text-based or text-communicative virtual assistant generally, or specifically those text-based virtual assistants accessed by online (e.g., network-based) chat systems. A chatbot (also known as a smartbot, talkbot, chatterbot, Bot, IM bot, interactive agent, conversational interface or artificial conversational entity) refers to or includes a computer program or an artificial intelligence system which conducts a conversation via auditory or textual methods. Such programs can be designed to simulate how a human would behave as a conversational partner, and can be used for various practical purposes including customer service or information acquisition.

Additionally, as a particular agent of an entity is conversing vocally (e.g., via a VoIP-type channel) with a client, the spoken conversation can be captured via one of the inbound types of channels and transcribed from audio to digital voice data. The conversation may also involve use of multiple types of different channels transpiring and/or utilized concurrently or in sequence such as two of more of the following channel types: chat, email, SMS and VoIP. In specific aspects, a data-communications server operated by the data-communications provider can capture and analyze conversations of many (e.g., 10,000 or more) agents, which can be stored in a directory. Using a selected reply channel, a client or user on the agent side can communicate with a web client, such as a Virtual Contact Center (VCC) web client, and a client on the provider side. In some embodiments, the client on the agent side can transcribe the conversation from audio to the digital voice data. In other embodiments, the client on the agent side can communicate the audio to a data-communications server operated by the entity, which transcribes the audio to digital voice data using processing circuitry in communication therewith. The processing circuitry can form part of the data-communications server or be separate therefrom. As used herein, the digital voice data is indicative of transcribed audio conversations between agents and others (e.g., customers or other external personnel) of remotely-situated client entities.

In specific embodiments, the processing circuitry analyzes the received digital voice data, the digital voice data being from the data communications services provided by the data-communications server. The analysis can include identifying keywords from the digital voice data, which can be, alone or together, associated with at least one (deduced/discerned) intent or at least one topic of the transcribed audio conversation.

In various specific embodiments, the processing circuitry identifies keywords in a text-based message received by a virtual assistant associated with the remotely-situated client entity. However, the present disclosure is not so limited as the virtual assistant may be more capable of receiving and processing different types of communications such as for receiving and processing text-based and/or voice-based messages which are converted to digital form to become effectively text-based messages.

The processing circuitry can correlate the text-based and/or voice-based messages with at least one intent or at least one topic by matching keywords from the archive of digital voice data with the identified keywords from the text-based message. Such correlation can be in response to identifying the keywords in the message, and/or in response to receiving the keywords, such as from a third-party service.

In response to the correlation of the text-based message with at least one intent or at least one topic, the processing circuit can automatically configure the virtual assistant associated with the remotely-situated client entity to address the received text-based message, based on the correlation. For instance, the processing circuitry is configured and arranged to present to a participating client station (e.g., smartphone, user-based CPU, etc.) a dynamic series of inquiries to address text-based messages received by the text-based virtual assistant, and to automatically adjust the dynamic series of inquiries based on the correlation. In various example embodiments, the processing circuitry is configured and arranged to present the dynamic series of inquiries to the participating station as part of a virtual assistant displayed on a graphical user interface of the other participating station or a voice prompt provided to the other participating station, based on the correlation.

In various example embodiments, the correlation of keywords to particular topics and/or intent can be user-configurable. For instance, the processing circuitry can be configured and arranged to provide to each respective client and/or client station, an option to configure the virtual assistant and specify different sets of inquiries to be presented to the participating station in response to the at least one intent or at least one topic for text-based message meeting predefined client-specific criteria. The text-based message can be received as part of a text-based virtual assistant session, and the processing circuitry can be configured to terminate the text-based virtual assistant session in response to an indication that the text-based message was addressed using the text-based virtual assistant. In such embodiments, the processing circuitry is configured to maintain a client-specific database that correlates communication attributes (such as one or more keywords, terms, foreign languages, identification associated with sender, etc.) discerned as being present in the communications with at least one issue or topic, and may then use the correlated attribute to identify which of the channels types to use for a reply and/or which level of security to apply to the reply communication and/or interaction record. Using the client-specific database, the server (or arrangement of servers) is configured to compare a keyword identified from the subsequent text-based messages with information stored in the client-specific database, and generate the dynamic series of inquires based on the comparison.

Additionally, the processing circuitry can be configured and arranged to present to the participating station a dynamic series of inquiries to address text-based messages received by the text-based virtual assistant. The processing circuitry can automatically adjust the dynamic series of inquiries responsive to input received via the text-based virtual assistant, and route the text-based message to a particular branch or extension of the client entity based on the correlation and the input received via the text-based virtual assistant.

In some example embodiments, the processing circuitry is configured and arranged to analyze the archive of digital voice data indicative of transcribed audio conversations between the client station and the other participating station to identify keywords and speech characteristic parameters associated with at least one intent or at least one topic of the transcribed audio conversations. Based on the analysis of the archive of digital voice data, the processing circuitry can predict at least one intent or at least one topic of the communication message (e.g., voice-based and/or text-based message) based on identified keywords and/or speech characteristics of the text-based message as correlated with the archive of digital voice data. The processing circuitry can then supplement the archive of digital voice data to include the correlation between the identified keywords and characteristics of the text-based message and the intent and/or topic, such that the correlation can be used to identify an intent and/or topic of subsequently received text-based messages. Further, as noted above, such correlations may be used for selecting the type of channel for a reply communication and/or for an interaction record, for selecting an applicable (or correct) security level or memory location in which the interaction record is to be stored (e.g., cache memory for expected prompt reuse, high-level security, special labeling for further monitoring by employer, and/or storage for possible further review).

While non-speech characteristics/parameters may also be accounted for (e.g., emojis, symbols and non-letter characters such as "!!!", "~" and "?"), exemplary speech characteristic parameters can include a frequency, wavelength or velocity, and/or amplitude of the audio in the communication. In some embodiments, the speech characteristic parameters can be compared to a baseline of the agent to determine a tone. In other embodiments and/or in addition, speech characteristic parameters of the customer can be compared to thresholds to determine a tone. In a number of embodiments, the threshold can be different for different geographic regions, different types of customers (e.g., age, sex), and different industries, among other types of classifications. In addition, particular keywords can be associated with and/or indicate a greater probability of a particular tone, sentiment, and/or outcome. As a particular example, the phrases "I want to speak to a manager" or "What is your name" can be associated with a conversation that is not going well for the agent. In other instances, "What is your name" at a particular frequency can be indicative of a positive outcome (e.g., an agent resolves an issue and the customer would like to commend the agent). Although as may be appreciated by one of ordinary skill in the art, embodiments are not so limited and can include a variety of different associations. Further, in various embodiments, the same keywords or phrases can indicate different tones or outcomes for different types of customers.

In some example embodiments, the processing circuitry is configured and arranged to present the dynamic series of inquiries to the participating station as part of a text-based virtual assistant. In such embodiments, although the virtual assistant is provided in a text format, the processing circuitry can route the text-based message to a representative of the client entity based on the input received (e.g., via the text-based virtual assistant) and in response to an indication that the text-based message was not responded to, or sufficiently addressed using the virtual assistant. In such example embodiments, the processing circuitry is configured and arranged to generate a transcript of the dynamic series of inquiries and any responses provided using the virtual assistant; and provide the transcript from the virtual assistant to the representative in response to the routing.

FIG. 1A illustrates one such example data-communications system in block diagram form and consistent with certain of the above-related examples and aspects of the present disclosure. As shown in FIG. 1A, the data-communications system includes a data-communications server 110 configured to provide data communications services, including data communications such as VoIP calls and other types of interactions (e.g., text, chat, email, etc.), for a plurality of endpoint devices 118, 120, 122, 124, 126, 128 connected in one or more data networks 114, 116, 119. Using such a system, exemplary aspects of the present disclosure may be apparent from the above discussion regarding use of a unified communications platform for facilitating different types of communications services, a channel-communications management circuit to (effectively) merge data communications selected to be received over different channels, and/or selection of one of the different communications channels in response to a request for a follow-up communication after the user receives an inbound interaction via the server arrangement. Exemplary aspects may also involve a data-communications apparatus or system capable of communicating over a broadband network (e.g., Internet, other private and/or public network) with a plurality of remotely-located data-communications circuits respectively associated with a plurality of remotely-situated client entities. The unified-communications platform (including call center or "UC-CC" platform), which is integrated with a memory circuit including a database of information sets, processes incoming data-communication interactions including different types of digitally-represented communications. Among such communications may be an incoming communication or call (e.g., "interaction"). Each of the information sets includes experience data corresponding to past incoming data-communication interactions processed by the platform, and with aggregated and organized data based on data collected in previous incoming interactions. The platform accesses the database and may: use past interactions and other data sources; and facilitate an automated self-service experience for users by resolving inquiries discerned through the incoming interactions; and/or effecting call-decision routing of incoming interactions to call-center agents or specialists.

In more specific embodiments, the data-communications server 110 includes an arrangement of coordinated servers such as one or more VoIP communications servers that provide VoIP communications and one or more other types of communications servers that provide such other forms of data communications service(s). Although FIG. 1A illustrates two data networks 114, 116 communicatively coupled to the data-communications server 110, examples are not so limited and the data-communications server 110 can be communicatively coupled to three or more data networks, including as examples but not limited to broadband networks such as the Internet, cellular-telephony and/or satellite communications networks, etc. Such networks and communicatively-coupled endpoint devices are configured to communicate with one another (directly and/or indirectly) using data-communications circuits which are typically wireless transceivers with user interfaces (graphic user interfaces, audible, etc.). For purposes of facilitating discussion, various specific embodiments are herein directed to methods and apparatuses that include the data-communications server 110 and processing circuitry 106 in one or more of the above-noted variety of forms. Although the processing circuitry 106 is illustrated as a component of the data-communications server 110, embodiments are not so limited and the processing circuitry can form part of or be separate from the data-communications server 110.

The endpoint devices are circuit-based instruments that may be used by personnel (or users) and include data communications-enabled circuitry, such as VoIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device may be respectively associated with an account of a respective client. Endpoint devices can be associated with a particular client account by registering the endpoint device with a particular client account serviced by the data-communications server 110. Registered devices for each client account can be listed in a respective account settings file (not shown) stored by the data-communications server 110. In this example, endpoint devices 118, 120, and 122 are associated with an account 113 for a first client A and endpoint devices 124, 126, 128 are associated with an account 115 for a second client B. In such a manner, a plurality of endpoint devices can each be serviced by the data-communications server 110 in accordance with aspects of the present disclosure. One or more of the clients can have client servers and/or databases 121 used to implement a variety of different services.

Accordingly, the endpoint devices are data-communications circuits which may be remotely located relative to the data-communications server 110 and may be respectively associated with remotely-situated client entities. In certain but not all embodiments, the data-communications system may include the remotely-located data-communications circuits such as client station. In some instances one or more of the endpoint devices corresponds to and/or includes a computer or a smartphone (e.g., mobile phone or tablet) that functions as a softphone by running application software; and/or a computer or a smartphone to operate natively within a web browser (e.g., using webRTC) and in turn the web browser is to run on such a computer or a smartphone.

The system may include one or more processing circuits configured to implement client-specific control engines 112, which are configured to adjust the data-communications provided for each client account according to a respective set of control directives. For instance, the client-specific control engines 112 can adjust routing of an incoming interaction (e.g., a VoIP-type data or text communication) to or from a client account by generating client-specific sets of control data to the data-communications server 110.

In certain different embodiments, the client-specific control engines 112 are implemented in various locations. For example, client-specific control engines 112 for one or more client accounts can be implemented in a central server connected to, or incorporated with, the data-communications server(s) 110. Additionally or alternatively, one or more client-specific control engines 112 can be implemented by one or more processing circuits maintained by the client including, for example, database circuit 101 which may include a database manager which may include configurable input-output (I/O) memory-access circuitry (in some implementations including security-controlled access and filtering functions, for example, based on client/user profiles and/or AI/ML-provided data or feedback). Similarly, the control directives can be stored locally within the client-specific control engines, or stored remotely (e.g., in a centralized database, in a database maintained by the client or a combination thereof). In certain specific examples, the database manager (and/or database 101) refers to or includes a relational database management system (RDMS) which stores data securely and returns the data in response to requests from other applications, as implemented by a database management server, and which can temporarily store data in cache 105.

In one specific example, the system shown in FIG. 1A includes a data-communications server 110 that may be configured as a unified-communications and call center (UC-CC) platform, or alternatively as another type of data communications server platform, that processes incoming data-communication interactions including different types of digitally-represented communications (e.g., text, chat, email, etc.). The platform may be integrated with a memory (database) circuit 101, and optionally with cache memory 105 for quick access to high-priority calls or calls requiring relatively significant analysis and processing. The memory circuit may include a database (such as 101 or a separate memory circuit) having a plurality or a plethora of information sets. Each of the information sets may include user/client-entity contact information and/or experience data corresponding to past incoming data-communication interactions processed by the platform, and with the information sets being populated via an aggregation of organized data based on data collected in previous incoming interactions. The platform regularly accesses the database to assess the incoming interactions and may use past incoming interactions along with information collected via other data sources (e.g., internal to the system such as AI/ML modeled data and/or third-party information). By analyzing the incoming interactions and accessing possible associations relative to the information sets in the memory circuit 101; the platform is able to facilitate an automated self-service experience for users by resolving inquiries discerned through the incoming interactions and/or effecting call-decision routing of incoming interactions to call-center agents or specialists. For these and other applications, the database circuit 101 may be used to store data files associated with the effective merging of communications involving different channels (e.g., interaction records, user profile setting and selectable, preferred or correct reply channels responsive to correlations of subject matter discerned from inbound communications, etc.).

Such automated self-service experiences provided via the data-communications server 110 of FIG. 1A may be realized by the processing circuitry 106 including various circuits (e.g., servers, software-directed aspects of CPU(s), logic circuitries, etc.) such as having analytics circuitry 102 to analyze an incoming interaction relative to content in the database 101 and/or to AI/ML models (not shown in FIG. 1A), having decision-routing circuitry 103 for deciding whether and/or how an incoming interaction should be routed, and in certain more specific examples or applications also having feedback circuitry 104. In specific embodiments, the data-communications server 110 may use the analytics circuitry 102 to analyze an incoming interaction by capturing and analyzing digital voice data from spoken conversations in connection with incoming interactions such as between agents of a client entity and customers. The spoken conversations may be transcribed from audio to digital voice data by the data-communications server 110, the endpoint device of the agent via a client on the endpoint device, and/or a client data-communications server which is remote from and communicatively coupled with the data-communications server 110. The transcription of the spoken audio words to digital voice data can occur via a variety of methods. By discerning the contact information and/or other content (e.g., context of call and/or the transcription), the decision-routing circuitry 103 can access the information sets to check for associations and, if certain associations relevant to the current (e.g., live) call are detected, the call may be routed as indicated by an associated one of the information sets, by user/client-entity profile settings stored with or linked to the associated one of the information sets, and/or based on a metric indicating sufficient confidence that the routing the call to a specific designation is appropriate (e.g., to an expert such as a specialist having been training or otherwise having special knowledge regarding topic discerned from the call, or to an agent/manager who is assigned to the topic or incoming interaction), and each such decision may be discerned by accessing and analyzing the information sets.

Further aspects and example (optional) responsibilities of these circuitries 102, 103 and 104 are discussed further below, for example, in connection with related examples such as an example block diagram shown in FIG. 1B, and in connection with example manners in which incoming interactions (calls) may flow as in the diagram of FIGS. 3A-3B. Other examples should be readily apparent from aspects discussed in the present disclosure.

In various embodiments, the data-communications system can also track a variety of information, parameters and/or metrics related to calls (i.e., incoming interactions) made or received by the agents of a client entity via processing circuitry 106 that is communicatively coupled to the data-communications server 110. The parameters can include information such as average call duration, compliance of call opening and account information, identification of issues and troubleshooting, resolution, professionalism, and other metrics. The parameters can be scored (e.g., percentage or other value scored) to rate the particular agent on each particular call and to form a metric used to assess an agent. In some embodiments, the parameters and/or metrics can be assessed automatically by the system using keywords. In other embodiments and/or in addition, the calls are recorded and can be replayed for a person to score (or update an automatic score) on the metrics. The parameters and/or metrics can be used to determine an outcome of the call. For example, the resolution can be indicative of the outcome. The scores can be reviewed upon recording the calls which can be reviewed by a reviewer. For example, the reviewer can listen to the call recording while a user interface is displayed on a computing device associated with the reviewer. The user interface displayed can illustrate a timeline of the recorded call, and which can show timing of the current voice data being played. The timeline can allow the reviewer to navigate within the call by selecting portions of the timeline to change what the reviewer is listening to. Additionally, the agent and the customer can have different audio waveforms (e.g., detected as unique aspects of speech characteristic parameters) for efficient reviewing. In other embodiments, other types of analysis are used, as further described herein.

In a number of embodiments, a particular client can customize the metrics that are to be tracked such as by the server 110 of FIG. 1A. Such customization can include the type of metrics, values given, and/or particular phrases or statements for complying with the metric (e.g., a specific call opening). For example, the customization can include definitions of performance expectations and scores, as well as performance thresholds for various metrics.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

As previously described, client-specific control engines can be used to facilitate adjustment of a variety of remote services including, for example, data-communications services such as VoIP calls, audio and/or video conferencing, general private branch exchange services, packet switching, chat, and traffic management as well as non-VoIP services including, but not limited to, website hosting, remote data storage, remote computing services, and virtual computing environments. One or more of such services can be provided, for example, by a cloud computing network having one or more servers configurable for a plurality of clients.

As may be appreciated, audio from an incoming interaction (e.g., incoming VoIP and/or video call) can be transcribed to text using a variety of techniques. As an example, an audio file can be generated and provided to speech recognition circuitry, which can be part of the endpoint device, the data-communications server 110, or other external circuitry. The audio file, which includes an acoustic signal received by a microphone of the endpoint, is converted or transcribed to text (e.g., a set of text words) by the speech recognition circuitry. In various embodiments, the speech recognition circuitry can use a voice model and/or database of words for converting or transcribing the audio to text. For example, the speech recognition circuitry can index the words in the audio file to identify words or phrases, such as using an extensible markup langue (XML), structured query language (SGL), mySQL, idx, and other database language. For more general and specific teachings on transcribing audio to test, reference is made to U.S. Publication No. 2009/0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424, 935, filed Jul. 31, 2000, entitled "Two-way Speech Recognition and Dialect System," each of which are fully incorporated by reference in their entirety for their general teachings and for their teachings in this specific regard.

As illustrated in FIG. 1A, the data-communications server 110 may interface with a plurality of remotely-situated client entities by way of data exchanges controlled by the processing circuitry 106. The processing circuitry 106 can receive digital voice data indicative of transcribed audio conversations between a plurality of agents and customers of a remotely-situated client entity and identify keywords and speech characteristic parameters from the digital voice data. In specific embodiments, the data-communications server 110 captures the digital voice data via a client on the agent side which may be communicating with a web client contact center and a client on the server side (e.g., a provider-side client as a circuit-based module inside the server 110) and provides the digital voice data to the processing circuitry 106. In other embodiments, the agent-side client communicates the digital voice data to the provider-side client. The provider-side client then provides the digital voice data to the analytics circuitry 102 for identification of keywords and/or speech characteristic parameters. The identification can include analyzing the digital voice data for matches to keywords and speech characteristic parameters stored in an archive and/or database 101.

As may be stored in the various information sets of the database 101, keywords and/or speech characteristic parameters can be associated with outcomes, in some embodiments. Example outcomes can include sale, no sale, and positive or negative tone/sentiment. A tone or sentiment of the audio conversation can indicate how the call is perceived by the customer. A tone or sentiment can be identified based on the speech characteristic parameters. Example speech characteristic parameters include frequency, velocity, and amplitude of the conversation.

In a number of specific embodiments, the speech characteristic parameters can be compared to one or more thresholds. For example, the processing circuitry 106 via the analytics circuitry 102, using the provider-side database 101, can identify a speech characteristic parameter which is outside of a threshold value (e.g., indicating an issue or potential problem), and which can correspond to or be indicative of a tone or sentiment of the conversation. As a specific example, audio above a particular amplitude and velocity can be indicative of a customer or agent who is upset or otherwise agitated. The thresholds can include generic thresholds (anything above a particular value), thresholds that are specific to geographic regions or types of customers, and/or baseline values of the specific speaker or agent. For example, if the speaker or agent's speech is faster and louder than their baseline, the speech may be indicative of an issue in the conversation. Further, for certain of the endpoint devices identified in the information sets and/or by way of the content of the incoming interactions being associated with certain conditional actions, the server 110 may predict or load the cache in anticipation of such speech and the call may be routed to a manager or other designated handler (e.g. other agent) better prepare to handle the call.

The processing circuitry 106 can provide association of the keywords and/or speech characteristic parameters with outcomes based on the analysis. The associations can be stored in the database 101 and/or provided to a client data-communications server 121 as feedback via the feedback circuitry 104. The feedback can be provided to a manager of the client entity and used for training purposes. Alternatively and/or in addition, the feedback can be provided to the particular agent in real time or near real time, such as while the audio conversation is ongoing. The feedback can include specific phrases to use and/or suggested changes in speech characteristic parameters.

In other embodiments, the feedback is provided to a manager, such as via a report that summarizes a subset of agents for the client entity. The report can include customer interaction feedback using the associations indicating negative and positive outcomes and associated keywords and/or speech characteristic parameters.

In some embodiments, the processing circuitry 106 can identify a speech characteristic parameter outside of a threshold value (i.e., indicates problem) or a keyword that is associated with a (manager) trigger, and in response, automatically bridge a manager of the respective agent into the audio conversation. The processing circuitry 106 and/or the data-communications server 110 can access a database to identify the manager and information for bridging the manager into the audio conversation.

In some examples, the processing circuitry 106 can store the associations in a database as an archive that is accessible and that ties the keywords with dates of the conversations and the speech characteristic parameters of the particular transcribed audio conversations. The archive can be adjusted over time based on additional audio conversations. For example, the processing circuitry 106 can adjust the associations over time based on further analysis of digital voice data and provide the adjustments as feedback. Alternatively and/or in addition, the adjustments can be based on user input, such as an input from an agent or a manager, as further described herein based on a tone/sentiment and/or keywords. In the following discussion, various implementations and applications are disclosed to provide an understanding of the instant disclosure by way of non-limiting example embodiments exemplified by way of VoIP-type data communications which typically involve a data-communications server communicating with an endpoint device, such as a VoIP-enabled endpoint device ("VoIP device") via a broadband network (e.g., Internet, WiFi, cellular) to connect with the data-communications server that is managed by an VoIP provider such as 8×8, Inc. and/or an Internet Service Provider (ISP) such as Yahoo or Google. Through such a server, call routing and other data communications services are managed for the endpoint device.

Users of a data-communications system can use a plurality of communications services to communicate with clients and other professionals and to carry out various tasks. For example, agents of a client entity can use a private network application to generate work products, a cloud-based application to manage service issues, another cloud-based application to manage direct communications such as email and chat messages, and yet another cloud-based application to manage financial matters such as billing and invoicing. In many instances, it can be beneficial for an entity subscribed to or that otherwise uses the data-communications system to analyze audio conversations across the entity (or across many entities) to improve subsequent interactions with the client or professional. For example, as a particular agent of an entity is conversing vocally with a client, the spoken conversation is captured and transcribed from audio to digital voice data (e.g., audio to data). In specific aspects, a data-communications server operated by the data-communications provider can capture and analyze conversations of many (e.g., 10,000 or more) agents, which can be stored in a directory. A client on the agent side can communicate with a web client contact center (e.g., via virtual access via the Internet), and a client on the provider side. In some embodiments, the client on the agent side can transcribe the conversation from audio to the digital voice data. In other embodiments, the client on the agent side can communicate the audio to a data-communications server operated by the entity, which transcribes the audio to digital voice data using processing circuitry in communication therewith. The processing circuitry can form part of the data-communications server or be separate therefrom. As used herein, the digital voice data is indicative of transcribed audio conversations between agents and others (e.g., customers or other external personnel) of remotely-situated client entities.

In specific embodiments, the processing circuitry analyzes the received digital voice data, the digital voice data being from the data communications services provided by the data-communications server. The analysis can include identifying keywords and speech characteristic parameters from the digital voice data, which can be, alone or together, indicative of a tone or a sentiment of a conversation (e.g., is the conversation going well or not). As related to previously-discussed example and in certain implementations, example speech characteristic parameters can include a frequency, wavelength or velocity, and/or amplitude of the audio. In some embodiments, the speech characteristic parameters can be compared to a baseline of the agent to determine a tone. In other embodiments and/or in addition, speech characteristic parameters of the customer can be compared to thresholds to determine a tone. In a number of embodiments, the threshold can be different for different geographic regions, different types of customers (e.g., age, sex), different industries, among other types of classifications. In addition, particular keywords can be associated with and/or indicate a greater probability of a particular tone, sentiment, and/or outcome. As a particular example, the phrases "I want to speak to a manager" or "What is your name" can be associated with a conversation that is not going well for the agent. In other instances, "What is your name" at a particular frequency can be indicative of a positive outcome (e.g., an agent resolves an issue and the customer would like to commend the agent). Although as may be appreciated by one of ordinary skill in the art, embodiments are not so limited and can include a variety of different associations. Further, in various embodiments, the same keywords or phrases can indicate different tones or outcomes for different types of customers.

The identified keywords and speech characteristics can be associated with outcomes of the transcribed audio conversation. The associations can be provided in an archive stored on a memory circuit and which can be updated over time. In various embodiments, the outcome can be determined based on the keywords and/or metadata in the digital voice data. For example, the processing circuitry can identify the keywords and compare them to previously-identified associations of keywords and outcomes. As a specific example, an entity can initially set-up an archive to include associated words and phrases that indicate a sale has occurred, a subscription is continued, a customer hangs up prior to a sale, etc. Alternatively and/or additionally, the archive can include thresholds for speech characteristics parameters that are indicative of different tones or sentiments. The thresholds can indicate or otherwise be associated with a positive conversation, a negative conversation, and changes in threshold indicating a change from a positive to negative or negative to positive conversation. Such thresholds can adjust over time based on feedback into the system and corrections by agents. For example, prior to storing an outcome as associated with a keyword and/or speech characteristics parameter, the outcome and the association can be provided to the agent and/or to a manager for review and approval. In response to an input verifying the outcome, the association is stored. In response to an input correcting the outcome, the associated is not store or a revised outcome is associated with the speech characteristics parameter and stored.

The analysis of the digital voice data can be used for training purposes. For example, a particular agent is provided feedback after the call on what keywords to avoid and/or strategies for the next call. More specifically, the feedback can include providing the association(s) to the client data-communications server and/or to the endpoint device of the agent. In a number of specific embodiments, the feedback or training can be provided in real time or near-real time during the audio conversation. For example, the agent, via an endpoint device (e.g., a computer or otherwise) can be provided a display or audio that cannot be heard by the customer, that indicates keywords to avoid, keywords to use, and/or directs the user to change their speech pattern (e.g., slow your speech down, take a deep breath). In some specific embodiments, specific keywords, alone or in combination with specific speech characteristic parameters, can cause an auto-trigger for connecting a manager to the audio conversation. For example, another endpoint device that is used by the manager can be bridged to the data communication, such as a VoIP call. The data-communications server can access a database to identify the manager and information for connecting the manager into the audio conversation. In this way, a manager can be bridged into a call without additional action by the agent. In some instances, different customers can have different keywords or speech characteristic parameters that trigger the connection with the manager. These keywords or speech characteristic parameters can be based on previous audio conversations with the customer, identification of a category of customer (e.g., important customer that is ranked 10 on a scale of 1-10), among other analytics.

In various embodiments, the processing circuitry and/or the data-communications server operated by the data-communications provider or a client side server can analyze the associations over a period of time, and generate a report indicating different outcomes and associated keywords and/or speech characteristics parameters. Such reports can be used for training purposes and can also be used to identify different patterns. For example, customers from different geographic regions can interact similarly or differently from one another. As previously described, specific keywords or tones can indicate different outcomes based on geographic regions, markets, type of customer, etc. The data-communications server and/or processing circuitry (which may be integrated with this server) can provide assessment of a quality of calls based on the analysis, and provide feedback to the entity. The feedback can be used for training, which can be provided in real time during the call or after.

In some specific embodiments, the analytics can be provided as a service by the data-communication (e.g., VoIP) provider. For example, the analytics can identify keywords and/or tones/sentiments that result in positive outcomes, and also keywords that provide faster outcomes. Additionally, the metrics used to assess the outcome and/or the quality of the call may be adjusted over time. The adjustment can be responsive to additional digital voice data, and/or verification or adjustment by the agents or a manager to ensure the determined outcomes are correct. In a more specific example, the feedback can be provided by identifying customer-interaction metrics in the digital voice data. In some embodiments, the associations can be locked and a manager reviews the recommended adjustments (by the agent) and approves or denies the adjustment. The customer-interaction metrics include values or ratings of an interaction of an agent with a customer. For example, the customer-interaction metrics can include different ratings which can be impacted by the use or non-use of specific keywords, phrases and speech characteristic parameters.

The processing circuitry can analyze the data over time and across a plurality of agents. For example, particular agents can be identified for an entity that have customer-interaction metrics outside a threshold value. Such agents, for example, can be provided feedback, as described above, for training purposes. The feedback can include identification of customer-interaction metrics to adjust for potentially better outcomes or specific outcomes (e.g., a sale or customer retention). In some instances, the feedback is provided in real time and/or during the conversation, such as recommended phrases to the say to the customer and/or recommended adjustments in the agent's tone. The customer-interaction metrics can be tracked over time and/or adjusted using digital voice data of additional audio conversation.

In certain specific examples according to the present disclosure, a data communications system such as in FIG. 1A uses certain circuitry having certain more-limited analytics capabilities as depicted at 102 for conducting an initial analysis (e.g., determining contexts and related rules triggered by the interaction record) as an internal one of the communications services which may involve an internal analytics engine 107a which does not share attributes of the interaction record outside of the system in order to provide any available supplemental resources which may be helpful to the user or beneficial to the user's interaction. Where permitted by the user profile as discussed above, the data communications system of FIG. 1A may include pathways and protocols for sharing attributes of an interaction record with a third party engine 107b, as permitted by the user profile and as discussed above.

In certain examples, only one of the analytics engines 107a and 107b is used by the data communications system, whereas in certain other specific examples, the analytics engines 107a and 107b may communicate with one another by using an encrypted protocol and/or a private channel (e.g., as opposed to one of the channel types used by the system to route incoming calls on behalf of client entities). Accordingly, the user-configurable user profile may be used to control an extent to which sensitive-user information may be passed from the system to equipment of a third party, thereby blocking access to selected parts of the user's interaction record while still permitting equipment of a third party to be applied to the interaction record in order provide any available supplemental resources which may be helpful to the user or beneficial to the user's interaction.

In certain specific contexts such as above wherein a third-party resource provider may be available to provide supplemental resources and/or intelligent analyses of calls being routed by the data communications system, the present disclosure concerns aspects for providing significant oversight of how sensitive-user data may be used to obtain these benefits. Consider the above context in which a third-party resource provider may be available to provide supplemental resources and/or provide intelligent analyses of calls being routed by a data communications system that is configured to provide communications services to a client entity (e.g., subscribing user of certain services offered by the data communications system). According to the present disclosure, such a system is able to merge related ones of the user's communication channels (of disparate types) into a common interaction record with one or more of the channels carrying sensitive client information and with the client entity pre-authorizing the system to use attributes of the interaction record with one or more third-party engines in the real-time in order for the system to gain access to and receive beneficial third-party services such as resources and/or intelligent analyses of subject matter relating to the interaction record. Such call-related attributes may include, as examples, names of individual persons/entities, topics, contexts, key words, and various terminology involving presumptively-sensitive data (e.g., health or HIPPA related, financial-related data, terms deemed to be related to proprietary business or research contexts, etc.).

Specific examples, in which such permission by the user is blocked, are carried out differently. In one example, a user profile is managed and configured by the user to indicate an initial set of particular circumstances in which one or more attributes from the real-time call, or merged may be conveyed, and one or more of the above exemplary attribute types are provided by the system via a GUI to help guide the user in selecting categories and more particular aspects such as key words, contexts, etc.

In other examples the user need not initially indicate or configure any particular circumstances, and the system operates in a default mode in which an assumption is made regarding conveyance of attributes to such third party engines. In one example of this type, call attributes are not prohibited from being conveyed to such third party engines except for a set of one or more certain attributes which are presumed to be user-sensitive. In more specific applications, examples attribute sets are as follows: certain financial data (e.g., credit-card and bank-account numbers); numbered data which may be used to specifically identify the user such as driver's license #, social security #, visa #, and passport #), individual names; logon and/or password information; data linked to certain codes, words, terms and phrases as used in the interaction record to indicate that a designated portion of the interaction record shall not be shared; and combinations thereof.

In yet further examples, such a default mode or an initial-user-configuration mode is implemented for a selected subset of one or more (but less than all) of the communications channels which may be involved in the call and subject to being merged into an interaction record. Accordingly, for each one of the communication channels, the default mode or the initial-user-configuration mode may be: applied (by the system automatically or selected by the user) on a channel-by-channel basis; implemented so as to be applied across all channels; or implemented so as to be applied once data from one of the disparate channels (or channel types) is selectively merged with data from at least one of the other channels (or channel types). In one or more of these examples, a user-operable GUI may be set up to facilitate the user changing the above types of operation. The GUI may be managed by the system in the form of a user profile for presentation to one or more of the endpoint devices registered with the system as being associated with the user.

In another specific example also according to the present disclosure, the data communications system may have a computing processor with an internal analytics engine (e.g., implemented with an artificial intelligence or machine learning algorithm) to manage the GUIs for each of the client entities (e.g., users) and to discern whether to reach out to one or more third party engines for supplemental help in providing relevant resources, wherein such relevant resources are deemed by the system or internal analytics engine as likely being helpful or advantageous to the user or to the interaction record. In certain specific examples, one or more third party engines respectively correspond to or are linked with various types of analytics packages which are available by way of a user subscription.

In certain other specific examples according to the present disclosure and as may be apparent from the above discussion, such a data communications system need not be processing data communications along disparate communication channels and/or be operating on such a merged interaction record in order to implement these types of user-profile oversight for reaching out to third party engines for supplemental help in providing relevant resources. As one example, this approach may be used where the communications system is processing and routing a data communication involving only one of various channels available to the client entity (e.g., a VoIP channel, an SMS channel or an email channel).

In other specific examples, the above-referenced analytics packages may be managed more directly by the data-communications service provider as opposed to one or more third-parties. For instance, the data-communications service provider may have a corporate subscription to use a plurality of different types of analytics packages and access to each such analytics package may be external to the system and at least in part generated by the one or more third parties (each of which may monitor call attributes sent by data-communications service provider access to the one or more analytics packages).

In other specific examples, the user-profile is accessed while one or more interaction records are being developed over the course of a real-time data communication (e.g., each interaction record being based on a data communication involving one or more channels) so that the system can recognize when certain actions should occur. For instance, the processing circuitry 106 of FIG. 1A may be configured, as one of the communications services, to access the user-profile to assess when the user should be notified to channel the type of communications channel to a more secure or private channel which is less susceptible to a breach. As one example, the user-profile might indicate that when certain words or phrases (e.g., "password is . . . " or "social security number is . . . ") are being shared over an SMS channel, the system is to notify the participants in the call of the sensitivity of the data and/or recommend a more-secure communication manner (e.g., manually or automatically reconnecting the call over a different network or one of the channels). Alternatively, the system may notify and/or take a different action such as blocking the sensitive portion of the data communication unless cleared by an authorized individual having data-management rights over the user profile.

Figure 1B:
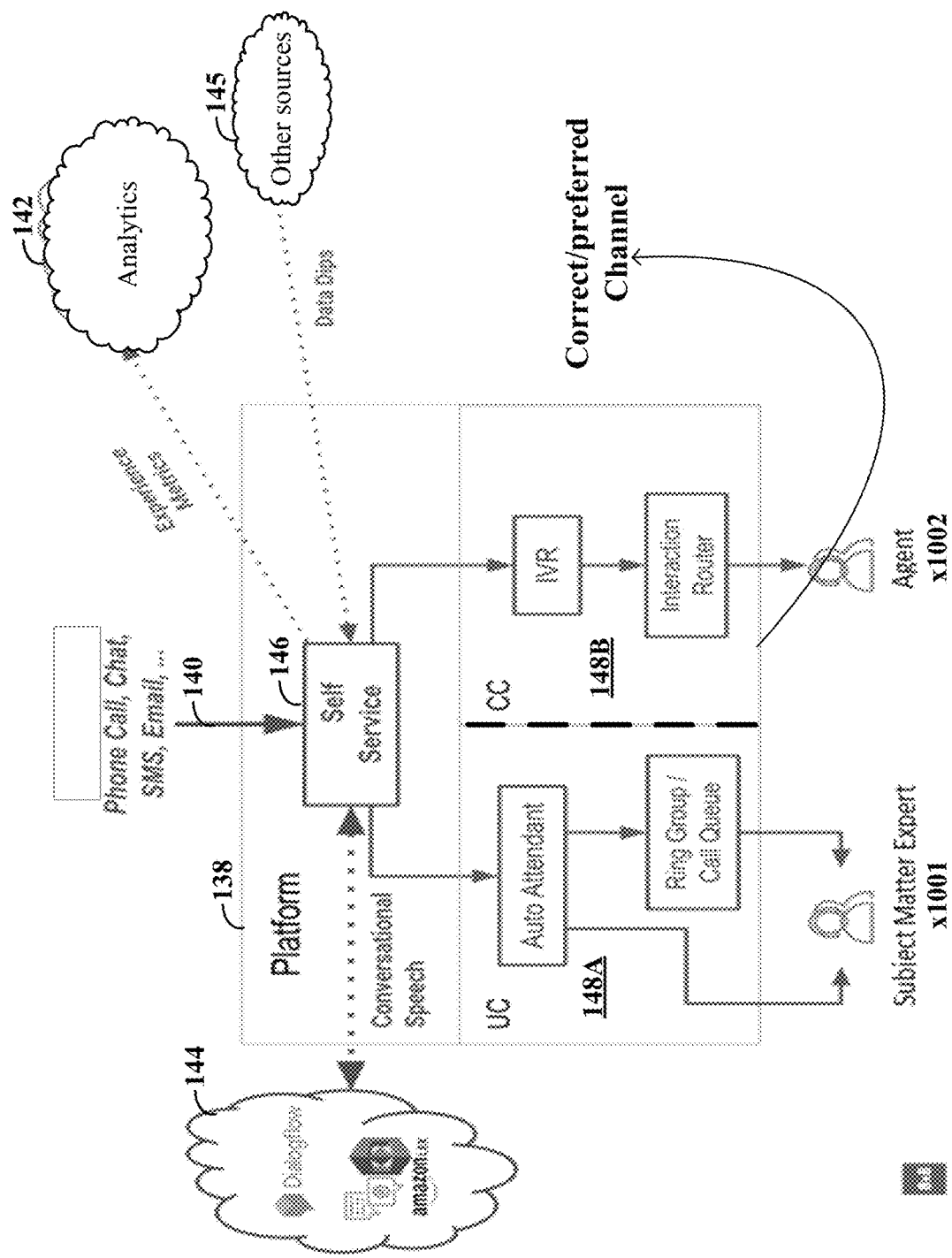
FIG. 1B illustrates another example data-communications system which is related to the system shown in FIG. 1A.

Another form of an example data-communications system is shown in FIG. 1B, which bears similar aspects as the system depicted in FIG. 1A. The example system of FIG. 1B also includes a data-communications server 138 configured as a unified-communications and call center (UC-CC) platform, which is shown receiving different types of communications, which include the types of incoming interactions via one or more network channels at 140, similar to the discussion of FIG. 1A. The system of FIG. 1B may also be configured for processing incoming interactions associated with the server 138 engaging in conversational speech and with other data sources via connections to other circuit-communicative endpoints through a broadband network (e.g., cloud-based). This pathway is shown connecting to external audio/video-communication-enabled equipment such as CPUs, smartphones, robots, etc.

An analytics (CPU) processor circuit 142 and other database/source circuitries (e.g., 144 and in some examples others) may be integrated with the server 138 but separated by pathways via one or more broadband connections. The analytics processor circuit 142 may be use as directly corresponding to the analytics circuitry 102 of FIG. 1A. Alternatively, the server 138 may have the analytics circuitry internal to the platform (not shown in FIG. 1B) and/or the analytics processor circuit 142 may be used selectively by the server 138 to complement the data and associations of the information sets stored in the analytics circuitry internal to the server 138. The other database/source circuitries 144 permit the server 138 to be connected to other sources of information including, as examples, AI/ML resource services which may be trained via data fed by the server 138, customer systems, and third-party servers (e.g., Lexis and Westlaw (online research), Salesforce™, Microsoft Dynamics, and other applications for business, research, etc.).

The server 138, as shown with conceptual (not physical separation of) responsibilities and tasks at 148A and 148B, processes each of these different types of interactions via an integrated memory (e.g., the database circuit 101 of FIG. 1A) for access to information sets which may have user/client-entity contact information and/or experience data corresponding to past incoming data-communication interactions processed by the UC-CC platform. The server platform receives and initially processes an incoming interaction via channel 140 so that an initial step of analysis may be performed. This initial step of analysis, which again may be performed conceptually on one or both the UC and CC sides, may involve, for example, security authorization, gate-way passing and/or handing off the incoming interaction to another module within the server or outside the server for further analysis such as the analytics processor circuit 142.

The vertical dashed line is used to show separation of responsibilities of the server conceptualized via UC side 148A and CC side 148B of the server platform; however, in certain example embodiments of the instant disclosure these UC-side and CC-side responsibilities may be actually implemented via physical/logical integration in various ways including the following specific examples performed by the platform/processing_circuit to provide an integrated secure-access environment and being performed as only one or a combination of one or more of the following. First, a high-level security-based firewall circuit (which may be integrated with the above-discussed database manager) for accessing one or more of the circuitries 101, 142 and/or 144 with secondary/tertiary level checks before granting accesses. Second, access to one or more of the circuitries 101, 142 and/or 144 being granted with the access pathway implemented as an internal bussing structure controlled by a database manager internal to the UC-CC platform, so as to control access requests to or from the platform. Third, granting such accesses while prohibiting traversal of any broadband gateway circuit and/or of any security-based firewall circuit. Fourth, granting such accesses so long as data provided from one or more of the circuitries 101, 142 and/or 144 occurs via a single access-based request-and-receive-data transaction, for example, a "single dip" transaction, involving only one of the circuitries 101, 142 and/or 144. Fifth, a limited number of such access-based request-and-receive-data transactions, for example, a "double dip" involving two transactions to any one of the circuitries and/or involving two transactions to two of the circuitries 101, 142 and/or 144 (or alternatively, a "triple dip" involving three transactions collectively to two or to three of the circuitries 101, 142 and/or 144). Sixth, granting such accesses while prohibiting (or exclusively permitting certain types of) data from being provided over any or one or more particular broadband networks, any or one or more particular gateways, and/or any or one or more particular security-based firewall circuits. Again, two or more of these examples may be used in combination, for example, with the sixth example being used with fourth or fifth example.

Next, the incoming interaction may be processed by circuit-based modules which traditionally are more closely associated with only one of the UC and CC sides. For example, as depicted in FIG. 1B at the UC side, activities may involve functionality auto-attendant operations and/or a ring-group/call-queue operations to permit incoming callers to access experts/specialists (e.g., a subject matter expert) having special knowledge concerning the nature, purpose or context of the incoming interaction as discerned by the analytics processing of the incoming interaction and/or as indicated by answers from the initiator (e.g., caller) of the incoming transaction to automated subject-based hierarchical queries from the server back to the initiator. The server/processing_circuit may route such a particular incoming interaction to a discerned one of various possible selected experts (or specialists) having a high likelihood of being able to address the issue of the incoming transaction. In more specific example embodiments, the server/processing_circuit may decide at which point to route the incoming transaction to such an expert or specialist (via real or virtual system extension x1001) based on a confidence level, relative to a fixed or variable threshold, that the discerned issue has been more than likely recognized as matching the knowledge category/categories of the expert or specialist. Moreover, the threshold and/or the manner in which the issue is discerned may be based on the server/processing_circuit assessing data from, as examples: information set(s) accessed in the database (e.g., 101 of FIG. 1A); analytics circuitries/modules (which may or may not include AI/ML models) whether internal to the data-communications system and/or external via a broadband and gateway to/from the system (e.g., via analytics processor and/or other database/source circuitries 142, 144 of FIG. 1B).

At the call center (CC) side, activities may involve interactive voice recognition (IVR) operations to permit incoming callers to access information automatically via a voice response system of prerecorded messages without having to speak to an agent, and/or use menu-driven options to have their calls routed to specific departments or specialists, with or without similar confidence assessment as described above in connection with the server/processing_circuit assessing data from the above-noted examples (e.g., via 101 of FIG. 1A and/or 142, 144 of FIG. 1B). As depicted at the bottom of FIG. 1B, the server/processing_circuit may route the incoming transaction to an agent, for example, via real or virtual system-based extension x1002, selected through the system's service-provided IVR experience.

Accordingly, with the example embodiment of the system shown in FIG. 1A, the related system depicted in FIG. 1B is able to facilitate an automated self-service experience for users by resolving inquiries discerned through the incoming interactions and/or effecting call-decision routing of incoming interactions to call-center agents or specialists, and this may be achieved by analyzing the incoming interactions and accessing possible associations relative to the information sets in the database, and/or other sources of information (and optionally, analysis).

In more specific examples and according to other aspects of the present disclosure, the UC-CC platform may process the incoming interactions in various ways and while making use of different resources (e.g., depending on the services linked to the respective incoming interactions and depending on aspects related to the call itself). The following explains some of these more specific examples, each of which is according to aspects of the present disclosure.

In connection with one such example aspect, the UC-CC platform is to read from the database to assess whether a selected one of the incoming interactions has source identification information associated with archived database information for indicating whether the selected one of the incoming interactions is to be routed, terminated or processed according to special instructions, and the UC-CC platform may write to the database to augment the database with information discerned from the inbound communication based on the source identification information and/or content deciphered from the inbound communication.

With regards to other example aspects, the UC-CC platform is to respond to a selected one of the incoming interactions, by: iteratively accessing the database to assess for whether the selected one of the incoming interactions has archived associations stored therein and to augment the database with new associations generated in response to analyzing content from the selected one of the incoming interactions; in sequence, assessing from the database whether the selected one of the incoming interactions has archived associations stored therein; and assessing whether there is sufficient information in the database for the selected one of the incoming interactions to be routed, terminated or processed according to special instructions. Further, the UC-CC platform may pursue at least one additional resource, according to client-specific profile data in the database, in an attempt to gain more information for the selected one of the incoming interactions to be routed, terminated or processed in a manner that is particularly based on this information. The additional resource(s) may include a series of queries fed back to the initiator of the selected one of the incoming interactions, and wherein in response to the initiator answering one or more of the series of queries, the UC-CC platform augments the database with new associations generated in response to the initiator answering one or more of the series of queries and/or trains AI/ML (artificial intelligence and/or machine learning) models for use in processing subsequent incoming interactions.

In connection with yet further aspects, the UC-CC platform may respond to a selected one of the incoming interactions by performing an analysis on whether source information and/or content data warrants augmenting the database with newly-generated associations, and also may perform the analysis based on one or more confidence thresholds, corresponding to metrics or parameters provided by client entities, which indicate likelihoods that the newly-generated associations have sufficiently-high integrity.

In a more specific example, the UC-CC platform includes a computer-based database manager for managing access (reads, writes, refreshes, cache management, etc.) to the database which may be formed of different regions of memory circuitry and/or different memory circuits. In this context, the database manager may act as an interface to various modules (e.g., programmed circuits) in the data-communications system which are to request access to the database for a selected one of the incoming interactions. As an example of use of the database manager in an integrated secure-access environment, the UC-CC platform accesses the database through an access pathway in which the circuitry of the database manager may be configured to respond to access requests from the UC-CC platform. In more specific examples of this type, the access pathway is situated so that access to the database does not traverse any broadband gateway circuit and does not traverse any security-based firewall circuit, and as in the above related example, alternatively for permitting access over the broadband network while limiting exposure to unauthorized accesses, the access pathway is situated so that access to the database does not traverse more than one broadband gateway circuit and does not traverse more than one security-based firewall circuit.

In another related, yet more-specific example, the UC-CC platform of one or more of the above data-communications systems accesses information regarding designated call-center agents and specialists which are stored in the database, and then routes the incoming interactions to the agents and/or specialists as may be appropriate given the particular details of the incoming interaction which are discerned by the UC-CC platform. In this regard, the UC-CC platform may also access the archived associations in the database for deciding whether to route respective ones of the incoming interactions to one or more of the designated call-center agents or one or more of the specialists having specific knowledge of subject matter discerned through the incoming interactions.

In certain situations, after a respective one of the incoming interactions is routed to a receiving party, whether one or more agents or one of more specialists or another party, the UC-CC platform may permit the initiating/receiving party of the incoming interaction to select a bridging option for causing a selected party to be bridged and joined into the incoming interaction, and this bridging could be to anywhere inside or outside the system or client entity related to the incoming interaction. Further, in response to the selected party being bridged and joined into the current (e.g., live) incoming interaction, the UC-CC platform may archive information to associate the call and the bridging into the database for use in a subsequent one of the incoming interactions. Also, according to another aspect which may be part of the automated self-service experience, the UC-CC platform may access the database for the subsequent one of the incoming interactions and in response to finding corresponding parameters for the incoming interaction, may cause the subsequent one of the incoming interactions to automatically bridge, or offer as an option to bridge, one or more agents and/or one or more specialists into the subsequent one of the incoming interactions.

As other aspects related to the above data-communications systems, the UC-CC platform may access the database for content in a selected one of the incoming interactions which content indicates whether to bridge a manager affiliated with an account, into the selected one of the incoming interactions. The affiliated manager may be identified by source information for the selected one of the incoming interactions and/or by associations stored in the database. Also, the UC-CC platform may bridge such a database manager into the selected one of the incoming interactions in response to discerning one or more of keywords, context, intonation, and speech characteristics, and the UC-CC platform may discern, in response to the accessing of the database for a selected one of the incoming interactions, whether to offer an entity affiliated with the selected one of the incoming interactions, one or more data-communications services and/or data analytics packages through which the user or affiliated client entity might gain access to metrics, outcomes and certain AI/ML models which are part of or being generated by the system. The database may also include representations of digital voice data associated with transcribed audio conversations which correspond to one or more of the incoming interactions, and may further include geographic information and/or calendar information provided by or associated with the one or more of the incoming interactions, wherein the representations of digital voice data include keywords and speech characteristic parameters associated with outcomes of, or with contexts relating to, the transcribed audio conversations.

In another example aspect, the UC-CC platform may affect the call-decision routing of the incoming interactions to the above-mentioned designated call-center agents or specialists based on a time-based assessment of whether the designated call-center agents or specialists are able to handle the routing of the incoming interactions. Such assessments of whether the designated call-center agents or specialists are able to handle the routing of the incoming interactions may be performed by predictive analysis, models and related system data.

Depending on the application, it will be appreciated that the UC-CC platform can be implemented to include a cloud-based set of data/call centers, at least one of which includes a plurality of data-communications servers respectively located in different physical locations, and that the UC-CC platform can include physically-separated virtual servers and/or circuit-based modules that are configured to work together so that they collectively function as a single unified server having integrated read and write access to the database without having to pass through a gateway of a third party entity (e.g., which is disparately managed relative to the service provider on behalf of the UC-CC platform). Also, such physically-separated virtual servers and/or circuit-based modules of the UC-CC platform may be configured and integrated for access to the database without having to pass through disparately-managed security-screening filters.

Figure 2A:
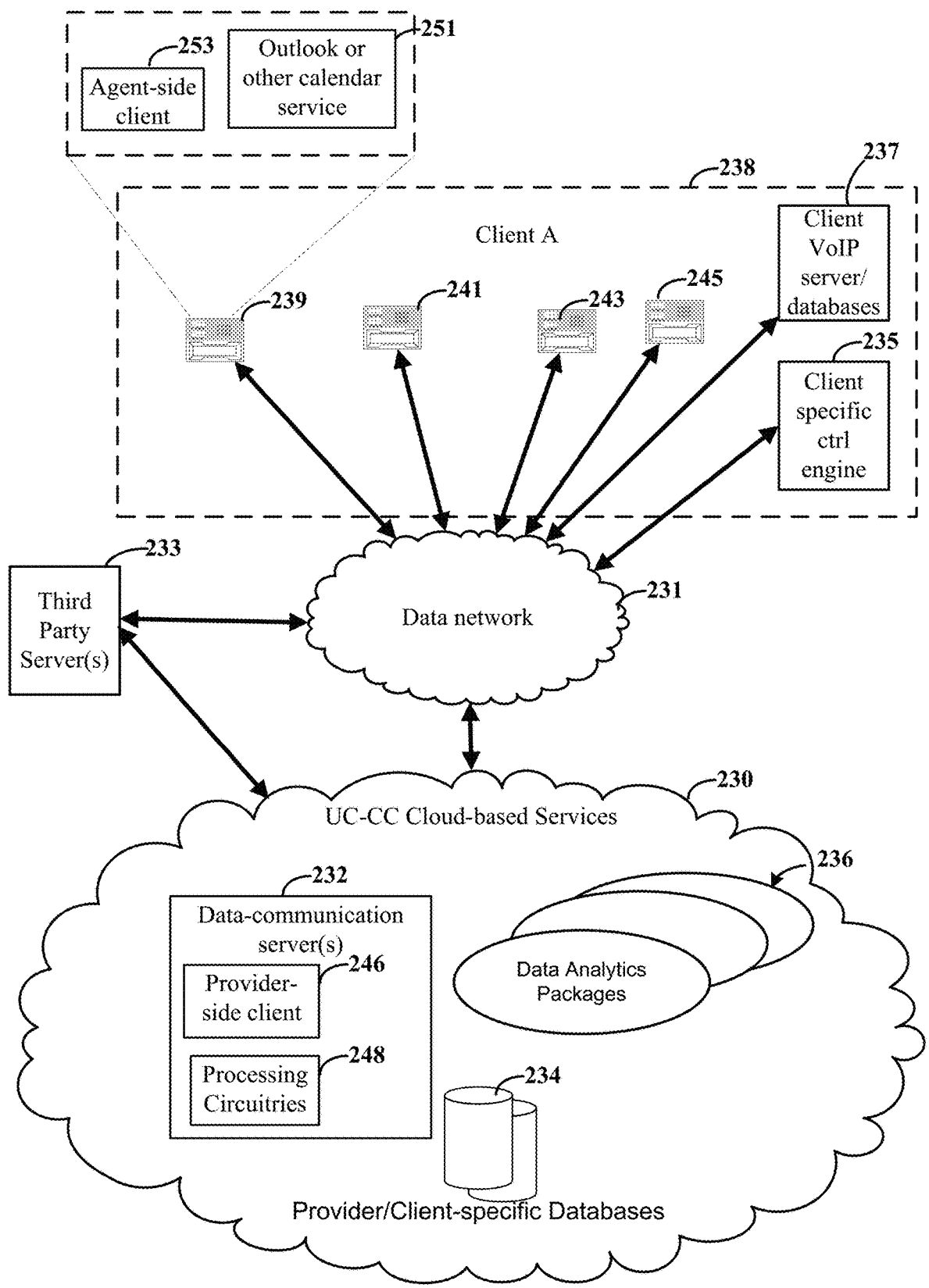
FIG. 2A illustrates another example data-communications system having aspects consistent with each of the above-illustrated example embodiments.

FIG. 2A shows yet another example data-communications system with circuit-based modules, a UC-CC platform/server via cloud-based services 230 detailed to show one or more data-communications servers 232 (having provider-side client circuits 246 and processing circuitry 248), provider/client-specific databases 234 (e.g., as being within the database 101 of FIG. 1A), and data analytics packages 236 which may be subscribed to and/or accessed by selected client entities to which the platform provides data communications services.

In connection with the specifically-illustrated example of FIG. 2A, endpoint devices 239, 241, 243, 245 connected in a data network 231 are configured to place and receive VoIP telephone calls between other VoIP endpoint devices, and/or between non-VoIP endpoint devices, although embodiments are not limited to VoIP communications systems. Non-VoIP endpoint devices can include, for example, plain old telephone service (POTS) telephones and cellular-capable devices, which might also be VoIP capable (e.g., smart phones with appropriate VoIP software applications). The various endpoint devices 239, 241, 243, 245 are associated with an account or account document 238 of a client (e.g., Client A) which may be electronically stored, and such devices include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VoIP endpoint devices 239, 241, 243, 245 can include, but are not limited to, desktop computers, mobile (smart) phones, laptop computers, and tablets. When each of the endpoint devices originates or receives a call in a telephone network, each can be characterized or referred to as an addressable call endpoint or a dial peer. The client can have or be associated with one or more client servers and/or databases 237 (e.g., and/or with each such set of client servers being integrated with the associated client database(s)) for storing various data and a client specific control engine 235.

The data (e.g., call) routing and other services for the VoIP telephone calls can be provided by one or more data-communications servers 232 within a UC-CC services system 230 which may be cloud-based as depicted in the example illustration of FIG. 2A (e.g., configured to provide a platform as a service (PaaS) to customers of the VoIP provider). In particular example embodiments, the data-communications servers 232 can be located within PaaS computing servers (not expressly shown in FIG. 2A), which are part of the UC-CC services system 230. The UC-CC services system 230 also includes one or more provider-hosted, client-specific control engines 235. A client-specific control engine can also be implemented locally by a client (e.g., 246). In some embodiments, data centers can be part of a cloud-based system where the hardware providing the cloud services is located in a number of different data centers with different physical locations. Consistent with certain embodiments herein, the cloud services can include session initiation protocol (SIP) servers, media servers, and servers providing other services to both VoIP endpoint devices and the users of the VoIP endpoint devices. In some instances, the various servers, including both the data-communications servers and data analytic servers discussed herein, can have their functions spread across different physical and logical components. For instance, a cloud-based solution can implement virtual servers that share common hardware and can be migrated between different underlying hardware. Moreover, separate servers or modules can be configured to work together so that they collectively function as a single unified UC-CC server.

In one particular example, a data-communications server uses Session Initiation Protocol (SIP) to handle various call functions (e.g., call setup and tear down); however, the various embodiments discussed herein are not necessarily limited thereto. Consistent with the above and other embodiments disclosed herein, such SIP-based data-communications servers may be VoIP communications servers configured to establish a leg of the call from the VoIP endpoint devices (or dial peers) to another VoIP endpoint device, or to a gateway.

According to various embodiments, one or more data-communications servers 232 can monitor and analyze call data relating to digital call data of calls occurring using the VoIP endpoint devices 239, 241, 243, 245 via processing circuitry 248. For example, a data-communications server (in the UC-CC platform as with FIG. 1A) may be configured to receive digital voice data, such as directly from an agent-side client associated with particular endpoint devices. The agent-side client can communicate the audio or the digital voice data to the provider-side client. The provider-side client then provides the audio or digital voice data to processing circuitry 248 which may include analytics and decision-routing circuitries (e.g., as shown in FIG. 1A) and in certain more specific examples may include processing/communications circuitry internal and/or external to the data-communications system for further analysis, such as transcribing to digital voice data, identifying keywords and/or speech characteristic parameters, identifying an outcome, and providing an association between the keywords and/or speech characteristic parameter using the identified outcome. The association can be stored in an archive in provider-side and/or client-specific database(s) 234. In some specific embodiments, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server to provide a new association and/or update an existing association. The script can use the information to generate a report that can be used for training, promotions, and/or other analysis of agents. According to various embodiments, the database queries can be sent to a client (aka customer) database 237. The feedback can be provided in real time or near real time to the endpoint device of an agent and/or can be accessed by a manager. Also, example feedback can include outputting a phrase to say during a live audio conversation to an endpoint device currently in use by the agent for the live audio conversation between the agent and the customer, outputting the phrase provided as data for display on user display of the endpoint device and/or audio provided to a speaker of the endpoint device, a customer feedback report using the associations indicative negative and positive outcomes and associated keywords and/or speech characteristic parameters associations. Consistent with certain embodiments, the data-communications server 232 can be configured to interface with a third party server 233 such as a customer server, or other third party servers. As previously discussed in connection with FIG. 1A, in certain examples according to the present disclosure, the third party server 233 may provide access to a third-party analytics engine which the data communications service provide may have access to for analyzing data communications involving the user so long as the user-provided filtering (e.g., by way of a user profile) permits for such access. For instance, a CPXML document stored by the data network 231 can identify, based upon a received call, a Uniform Resource Identifier (URI) that points to customer servers, or to other third party servers, and the user profile may permit for use of the system to reach out to the third-party analytics engine with certain attributes from the call so that the third-party analytics engine can intelligently understand the nature and/or other particulars of the active call and provide suggestions and/or information for advantaging the purpose of the call. In various examples, these suggestions and/or information may include competitive pricing information data, reviews of certain offerings (products and services), alternative offerings providing better average returns on the investment, websites where more data on a certain subject may be accessed, advertising information which is particularly relevant to an aspects (or attribute) of the call, provision of market research data specific to a certain type of product and/or other passed-along call attributes and in some instances, summary data regarding ongoing involvement regarding the call (e.g., length of call, ongoing costs associated with the call, etc.).

The one or more data-communications servers 232 monitor and analyze call data relating to digital call data of calls occurring using the VoIP endpoint devices 239, 241, 243, 245, can further analyze such assessment for different customers over many entities, and can provide the same as data analytic packages 236 via the processing circuitry 248. The packages 236 can be provided as a service to entities and can be based on geographic regions, markets, and type of customers. In specific embodiments, the packages 236 can be provided as a service and can be used for training agents for providing better customer interactions, such as suggested phrasing and words that result in particular outcomes and/or outcomes that are efficient. The packages 236 can be based on various customer-interaction metrics used to analyze the quality of calls.

As an example, the data analytics packages 236 can be offered as a cloud-based service to an entity to use for training purposes and/or otherwise improve or monitor customer interactions by agents. In some instances, the cloud based services can include automatic data blockers. For example, the data service provider can have data blockers which can automatically block particular data provides as part of the data analytics packages 236 to particular entities based on or malicious-activity data source concerns or based on privacy issues of concern to certain entities.

In various embodiments, the above-exemplified data-communications systems can be used to make data routing decisions for incoming interactions based on data across the UC-CC platform as well as one or more other platforms. The routing decisions, in some specific embodiments, are based on a predicted inability to handle a volume of incoming data communications, such as calls, although embodiments are not so limited and can include rerouting data or calls responsive to other indications (such as a region or branch of a client entity having negative customer interactions or other rationale). The decision can be made based on data obtained from endpoint devices of agents, data-communications server(s) operated by the service provider, and/or data-communications server operated by the client. In some embodiments, the prediction can be based on geography, system updates, schedules and keywords, and which includes unification between platforms of the data-communications system to provide better routing decisions. In a number of embodiments, the call traffic can be rerouted based on analysis of digital voice data.

The UC-CC platform can include the use of software, such as Microsoft Outlook, on the agent's endpoint device(s) to identify schedules, data from the client data-communication (e.g., VoIP) server to identify scheduled system updates and/or other system level issues, and digital voice data is analyzed to identify when to reroute traffic, as well as other data such as data obtained from a search engine. The digital voice data may be used to identify an agent that is leaving when not scheduled to, or that may be otherwise unable to take telephone calls. As an example, one or more agents may unexpectedly be unable to answer phone calls due to illness, weather or other catastrophes of the geographic region, family issues, unplanned work meetings, among other reasons. In some specific embodiments, an event can occur that may impact a variety of agents located at different geographic locations. The unification of the different platforms can be used to identify patterns, such as particular events that provide for different classification or groupings of agents (e.g., based on demographics such as age, sex, geography, and other demographics) are more likely to be impacted or relevant. As a specific example, agents that are between the ages of 18-25 may be more likely to ask for vacation time during the spring (e.g., Spring break). Additionally, agents that are known to have children may be more likely to ask for vacation time during Spring break of their children's school. As another specific example, patterns of a specific agent may be identified, such as common vacation requests (e.g., after or before a particular sports team has a game, during a political campaign, specific religious holidays, weather etc.).

Such situations may be identified based on keywords and may be associated with being out of the office or unable to answer calls (as an outcome in the archive). In addition to using the digital voice data to predict volume of calls that can be handled, the digital voice data can be used to make decisions as to where to reroute the calls. For example, calls can be rerouted to a region with similar types of keywords or speech characteristics and/or to particular agents that have experience with the same type of customers.

In specific embodiment, the analysis can include artificial intelligence used to predict a call answer rate of an entity and/or specific regions of the entity. The call answer rate can be based on general trends over time, such as identified patterns of agents in response to different events and/or situations. The patterns can be specific to an agent, e.g., Agent A takes time off when it snows more than three inches, and/or specific to a region, e.g., a particular region has 20% of agents unable to answer calls after it snows or rains more than three inches. Such patterns can be based on weather, local events (e.g., sporting events, political events, school calendar, such as scheduled days off, fundraisers and other), non-local events (e.g., national sporting events, religious holidays, general time of year) illness or other health related trends. As an example, a first entity may allow their agents to work remotely from home and a second entity may not. The second entity may be more greatly impacted by weather related events (e.g., more agents cannot make it to work and thus cannot answer calls) than the first entity. Such trends may be different for different locations and different demographic groups of agents. For example, agents of a particular age may be more likely to be unable to answer calls after a local sporting events than other agents, although embodiments are not so limited.

As described above, the data-communications system illustrated by FIG. 2A can be used to predict an ability to handle call volume, in accordance with various embodiments. The routing decisions can be made by one or more of the data-communications servers 232 based on a prediction of call volume that can be handled by agents of the entity. The predicted call volume can be determined using processing circuitry 248 and based on integration of data across a plurality of platforms, such as agent's machines (e.g., Outlook 651 to identify schedules), client server 237 (identify updates on server/system or other system level issues), and provider data-communications server 232 (including the previously described digital voice data and analytics of data to identify/predict when calls cannot be made), as well as other sources (e.g., Internet-based data). The processing circuitry 248 can analyze data identifying schedules of agents, send updates to the server or system, assess system level issues, and provide predictions of when agents may be available and/or how long calls may take based on archived data stored in the provider-side and/or client-specific database(s).

As previously described, the one or more data-communications servers 232 can monitor and analyze call data relating to digital call data of calls occurring using the endpoint devices 239, 241, 243, 245 and the processing circuitry 238. For example, a data-communications servers 232 can be designed to receive digital voice data, such as directly from an agent-side client (e.g., agent-side client 253) associated with particular endpoint devices and provide the same to the processing circuitry 248. The processing circuitry 248, although illustrated as a component of the data-communications server 232, can be external to the server 232 in various embodiments. The agent-side client 253 can communicate the audio or the digital voice data to the provider-side client 246. The provider-side client 246 may then provide the audio or digital voice data to the processing circuitry 248 for further analysis, such as transcribing to digital voice data, identifying keywords and/or speech characteristic parameters, identifying an outcome, and providing an association between the keywords and/or speech characteristic parameter using the identified outcome. The association can be stored in an archive in one or more provider-side and/or client-specific databases 234. In some instances, new keywords and/or parameter values are identified as having an association with an outcome. In other embodiments and/or in addition, a stronger correlation (e.g., probability) between the keywords and/or parameters is provided over time and responsive to multiple verifications of an association. For example, a script running the data-communications server 232 can parse call digital call data and stored association to generate database queries that direct the data-communications server 232 to provide anew association and/or update an existing association. The script can use the information to generate a report that can be used for training, promotions, and other analysis of agents. According to various embodiments, the database queries could be sent to a customer database and/or another third party server 233. The feedback can be provided in real time or near real time to the endpoint device of the agent and/or can be accessed by a manager.

In some instances, the analysis by the processing circuitry 248 can include predicting whether (e.g., based on a call volume) various agents can handle the call volume or can be used for routing decisions. The call volume predicted can be based on the data analytics packages 236 and/or archived data in the provider-side and/or client-specific database(s) 234 such as identification of average call times, which can be different for different types of customers, and for the respective agents, types of calls or customers predicted to be calling (e.g., average for time of year and geographic location as an example), prediction of system level issues and predicted agents that are available to receive calls. The prediction of availability of agents can be based on data from the agent's machine(s), such as Outlook or other calendar services or applications 251, or within the provider-side and/or client-specific database(s) 234 or as part of a data analytics package 236. For example, the digital voice data from a particular agent may include identification of a time the agent will not be available (has another call, a meeting, etc.). As another example, the data analytics package 236 may include identification of types of agents that may be unavailable in response to different events or times of the year (e.g., Spring break time, particular holidays, sporting events, natural disasters, etc.) and/or based on general trends in the locale and/or a particular region of the entity.

Additionally, decisions on where to reroute the calls to can be based on the previously described data analytics. For example, customers from the Southern region of the United States may respond better to different speech characteristics than customers from the Northeast region of the United States. Such associations may be determined over time, using the provider-side and/or client-specific database(s) 234 to capture the digital voice data associations, and may be across different entities, and can be used to make decisions on where to reroute calls. Such rerouting decision may be performed with or without the call volume predictions.

In response to a client not having such a service, the processing circuitry 248 can predict a call volume that can be handled, which may be less than a predicted total incoming call volume, and communicate the same to the data-communications server 232. The data-communications server 232 can offer the rerouting as a service to the client.

Figure 2B:
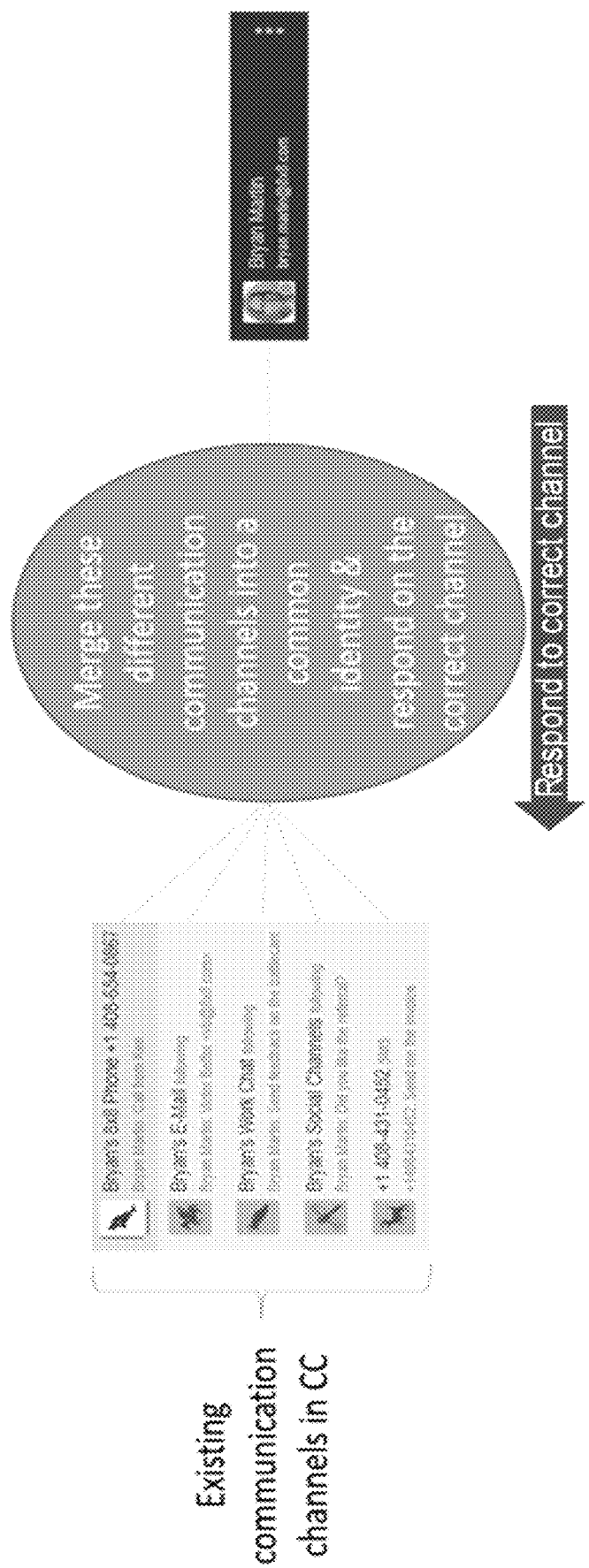
Figure 2D:
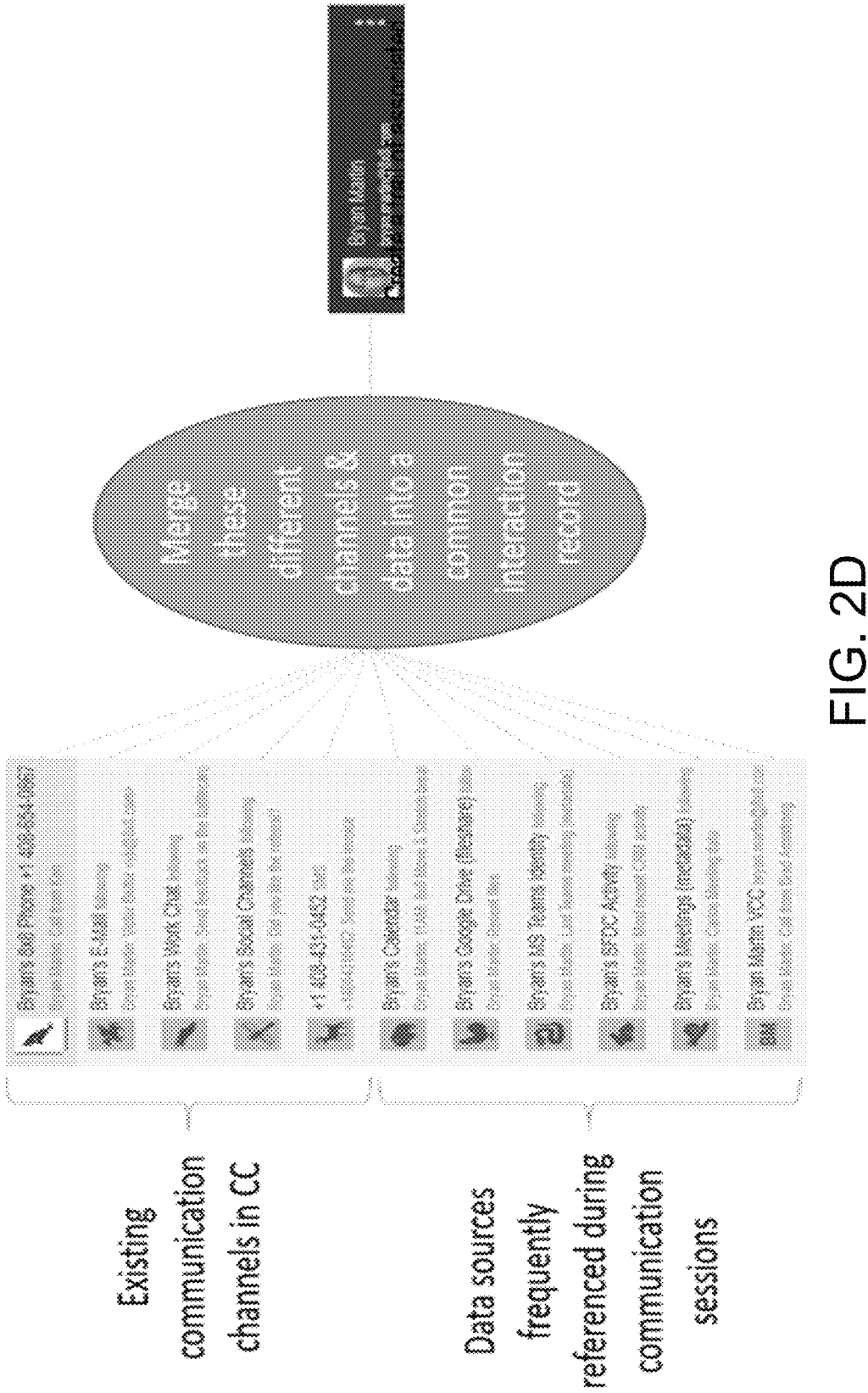

Turning now to FIGS. 2B through 2D, these diagrams collectively show examples of issues and solutions in which a data-communications system, such as shown in FIGS. 1A, 1B and/or 2A, may operate with aspects consistent with the above discussion of the previously-presented example embodiments of the present disclosure. Starting with FIG. 2B, on the left there are shown a plurality of channels in the contact center functionality (conceptually as in FIG. 1B) through which a user ("Bryan") may receive an incoming interaction. In the UC workspace (e.g., using an AI/ML process and/or this user's profile), an omnichannel is used to create a unified identity for the user to process data from different channels (e.g., store, retrieve, organize, etc.) and to reply/respond via a correct (and/or preferred) channel as may be selected for this unified identity. For a particular user of the communications services (e.g., recipient of inbound communications inbound to the data-communications server), the unified identity reflects a common identity of another participant in multiple communications using respectively different channel types. For example, if the same sender sends communications to this user on more than one of the channels, the user is able to see these communications via this effective merging of two different communications (which may be linked through a flag-like labeling association and/or actually merged into such an omnichannel), and the user is then able to reply/respond via a preferred or correct channel. Alternatively or in addition, the effective merging of the communications may be used to develop an actual interaction for recall by the user in a subsequent action/communication, and if a subsequent communication, the subsequent communication may involve the same (or different) participants via a preferred or correct channel.

In various embodiments, the preferred or correct channel (e.g., used in a reply or subsequent communication) may be configured or characterized in different manners. For instance, such a channel may be set (or reset) in profile settings for the user. In another example, such a channel may be configured as a default channel (e.g., a particular email) defined upon setting up the user for the system. In another example applicable to a reply communication involving the same participants, this channel may be configured as the most recent channel used by the two participants.

In yet another example, this channel may be configured as a function of subject matter discerned in one or both or the most recent one of the communications involved in the effective merging. In a specific example associated with certain aspects of a data communications system as in FIG. 2A, this discernment is performed by the processing circuitries 248 and/or the data analytics package 236 (FIG. 2A). The data analytics package 236 may discern that certain subject matter (e.g., as identified by subject heading, keyword, phrase, language or other type of recognition) in one or more of the involved communications is relevant to a communication category of a nature that falls into one of several categories which may be predefined and/or newly defined, such as: personal; work-related; work-related for a particular customer and/or particular topic (e.g., product, service and/or issue); health related; particular designated person (e.g., high-level job description, special name, special language (e.g., a foreign language or foul language), etc. For each such communication category, on behalf of the user (or a group of users such as may be designated by an employer or a social group), the processing circuitries 248 and/or the data analytics package 236 may designate one particular type of reply channel and/or security level for the interaction record. For example, if health related, the reply channel and/or interaction record may be unique relative to the channels or records used by the others; this follows as in a reply channel and/or security level for highly-sensitive information, it may be preferred to communicate by email instead of text, and to encrypt (or encode) the sensitive information for storage of the interaction record. As discussed in connection with a previous example, an associated user profile may be used by the system (e.g., with word, terms and the like generally designated or designated specifically for certain less secure channels or networks) to discern what attributes in the interaction record might cause such action to be triggered.

FIG. 2C shows an example set of communications in which two separate channels are processed separately, without such an omnichannel being used to create a unified (relational) identity for the user to process the interaction(s). In this example, raw data is provided to the system via different channel types such as channels respectively used for phone calls and messaging (e.g., the raw data may be in Word-D and/or Word-M formats). While the data communications system may track and record summaries of the calls (e.g., as call logs), the call logs are flat and not sufficiently developed and/or embellished such that there is no readily recognizable connection or association in the subject matter between communications (the phone calls and messages) across the different channel types. However, via three (GUI-provided) screenshots shown from left to right in FIG. 2C, such connection/association is established for creating a unified channel in which the messages are combined and associated in the system's relational database with indications of the communication participants (Persons A and B) and verbiage used in the interaction translated using natural language processing. The left screenshot reflects messaging involving Person A (e.g., Scott Sampson) and Person B (e.g., Bryan Martin) at 6:24 pm and at 6:45 pm, and the call logs via the middle and right screenshots show a presumptively-related phone call between Person A and Person B at 6:46 pm, within one minute of the messaging involving the same parties. For subsequent communications, any of a variety of preferred channel types may be used (for example, an email channel or the channel used in this instance which is for messaging) and the record of this previous interaction may be readily provided to Person A and Person B as described herein.

In another example related to FIG. 2C but not directly illustrated, an omnichannel (or unification channel) may be used as follows, and involving Person A and Person B for creating unified interactions in the unified communications (UC) workspace, whether or not the data communications system is characterized as or includes a UC-CC (unified-communications call-center) platform. The system identifies that Person A had an interaction across multiple channels with Person B on Wednesday 28 Apr. 2021 between the hours of 6:24 pm and 6:57 pm: three chat messages (with the content now stored in one of the system's databases, for example, via natural language processing); and three phone calls lasting a total of 10 minutes, 40 seconds (with this timing-related content identified via the system's analytics circuitry or module). During the phone-call conversation, the system discerns that Person B accessed a file on Google drive and the system's analytics circuitry compares words, phrases and similarity of subject matters to determine if the file data, as accessed during the phone call, is related to content in the phone-call conversation and if so, the file is attached to the interaction record for more immediate access by Person A and/or Person B. Otherwise (the file data is not related to content in the phone-call conversation), no such action is taken and as it may have been that Person B was simply multitasking while on the phone call. The system may monitor Person B's internal/external data accesses using any or a combination of various mechanisms including, for example, channels which connect the data-communications system (or UC-CC platform) with back-office system and/or tools. In this regard, examples of such back-office system and/or tools include: specified or dedicated input/output channels or routers; filtering mechanisms such as natural language processing in which key words passing through the filters such as use of such filters to identify specific sources and file requested by Person B via any of the communications channels or pathways to which Person B has access; and/or the system's quality management circuitry monitoring/recording of user interface for Person B (e.g., via Person B's GUI display screen) through which operations are identified and used to provide limited shots of attempts by Person B to access certain sources and files.

As an optional aspect useful and applicable in connection with certain of the above-described systems and circuits, the data communications system may periodically or consistently access other data sources, whether such data sources are internal or external to the system. In one particular example using this optional/alternative aspect, the different types of communications channels may include, but not limited to, channels characterized as: phone, email, messaging/persistent chat, social media, and SMS. Moreover, such data sources may include (among other possible data sources): at least one selectable calendar (storing events and/or attendees), Google drive and/or local drive (files), Salesforce.com (CRM), and Microsoft Teams and related tools.

FIG. 2D illustrates another optional/alternative aspect useful and applicable in connection with certain of the above-described systems and circuits and for what may be merged into a common interaction record on behalf of Person B in the above scenario. In this example, the data communications system may use such an omnichannel (or unification channel) as a common interaction record for access by certain authorized parties or individuals (such as Person A, Person B, another party and/or individual) and/or for another purpose such as finding personnel with possible expertise in a certain subject matter and/or general historical retrieval purposes such as is common in human resource audits concerning security, efficiency, productivity, etc. On the left, FIG. 2D shows existing communications channels grouped together in the CC (contact-center functional side of the system) and frequently-used data sources (referenced during communications sessions) also grouped together. These groupings are tagged as such and can develop into a common interaction record associated with Person B (and not necessarily have any relation to Person A). Depending on the implementation and key-word searching efforts in further communication interactions (e.g., as illustrated in connection with FIGS. 3A and 3B), this interaction record can be instantly retrieved for immediate recognition of previous activities including files accessed, meeting participants, customer information, etc.).

As another optional/alternative aspect useful and applicable in connection with certain of the above-described systems and circuits, the data communications system may use the unified interaction records, which may be stored logically in the system's database (for example, by subject matter, person(s) involved in the interaction records, and/or subject matter associated with the unified interaction records) for increasing productivity and communication-related efficiencies as the number of interaction records increase. Building on the above phone call interaction between Persons A and B, in Person B's next interaction with Person A on any of the different types of communications channels, because the preceding interaction records have been collected and logically aggregated, the records are immediately available for use by the system, and by Person A and/or by Person B in this next interaction. As for how such preceding interaction records may be used, the user profile settings for Person A and/or by Person B may be used to define permissions for retrieving, copying and/or forwarding one or more of interaction records, and this permission may in turn depend on security controls which label or tag the stored interaction records such as according to subject matter or person requesting access.

The above types of uses of preceding interaction records may also be used in connection with an onlooker mode in which the data communications system may permit, subject to such constraints as discussed above, Person B to pull up a history of all of the interactions and/or past activity streams of Person A (or of one or more other persons such as employees of a company employing Person A or Person B). Such interactions and/or past activity streams of Person A may include: all previous interactions and/or meeting in which both Persons A and B were participants (or contributors); any public rooms in which Person A had posted information; and any private rooms in which Person A had posted information and in which Person B was also a room member. Further, in connection with such next interaction(s) involving Persons A and B, a user interface operated by Person A and/or by Person B may be used by the data communications system to notify and provide a selectable icon to indicate that there is an accessible trail of such previous interactions and/or that such previous interactions may be immediately accessed or attached for review by Person A and/or Person B. It is appreciated that public rooms, for example, may be digitally-accessible memory or Internet locations accessible to more than certain specified individuals, as opposed to private rooms which may correspond to such locations accessible only to selected individuals and/or individuals specified by invitation.

Accordingly, having and/or providing to Person A and/or Person B access to their previous interactions may save time and support further productivity in subsequent interactions involving Person A and Person B and, in certain instances, in subsequent interactions by other parties (e.g., another person, one of their supervisors or employers, and/or the data communications system as the system discerns which previous interactions may or may not be related to other communications involving related subject matter and/or involving Person A and/or Person B).

Figure 3A:
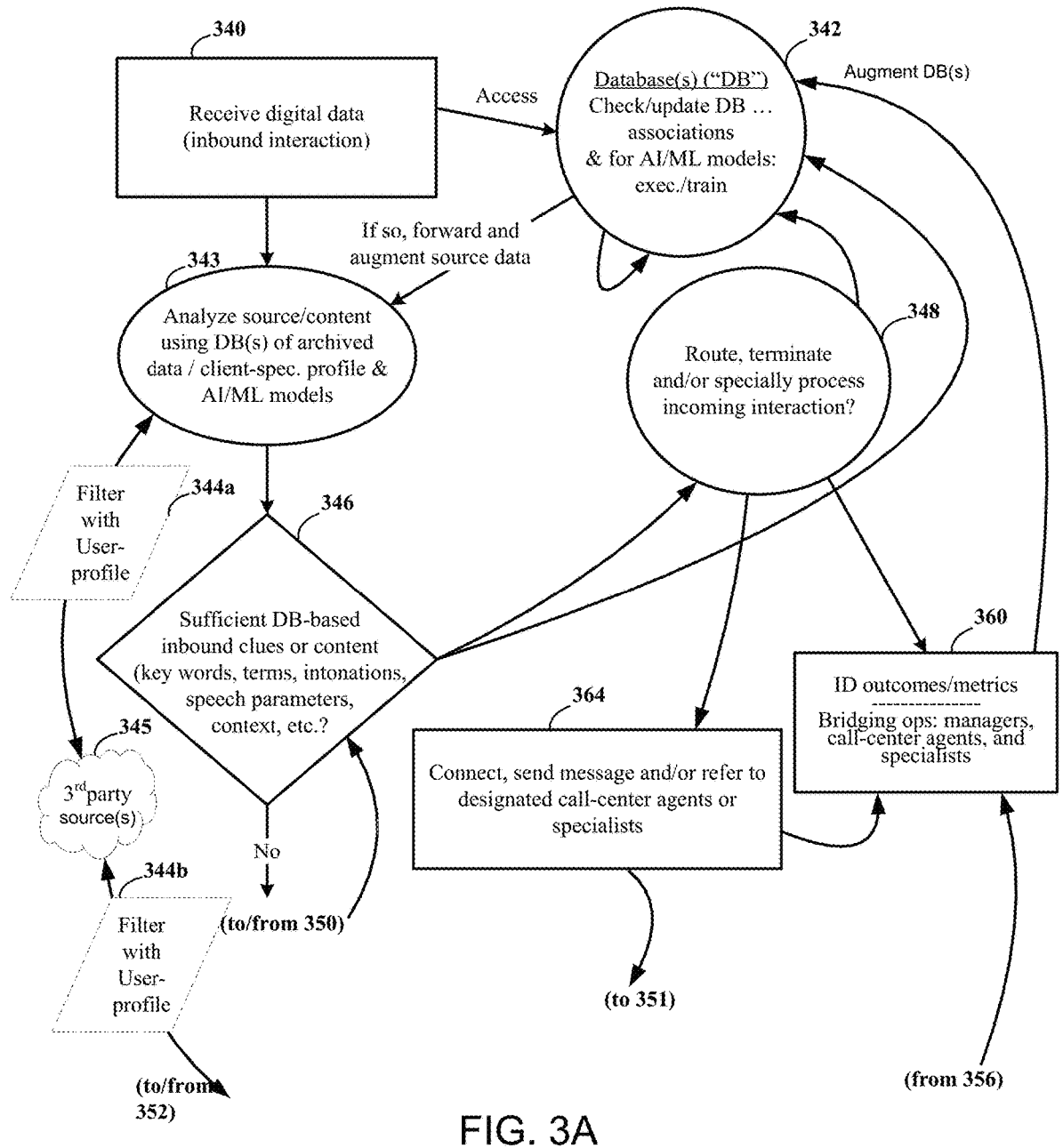
FIGS. 3A and 3B illustrate collectively an example manner of operation, in the form of an overall data-flow diagram, in connection with methods and aspects of a data-communications systems consistent with certain of the above example embodiments.
Figure 3B:
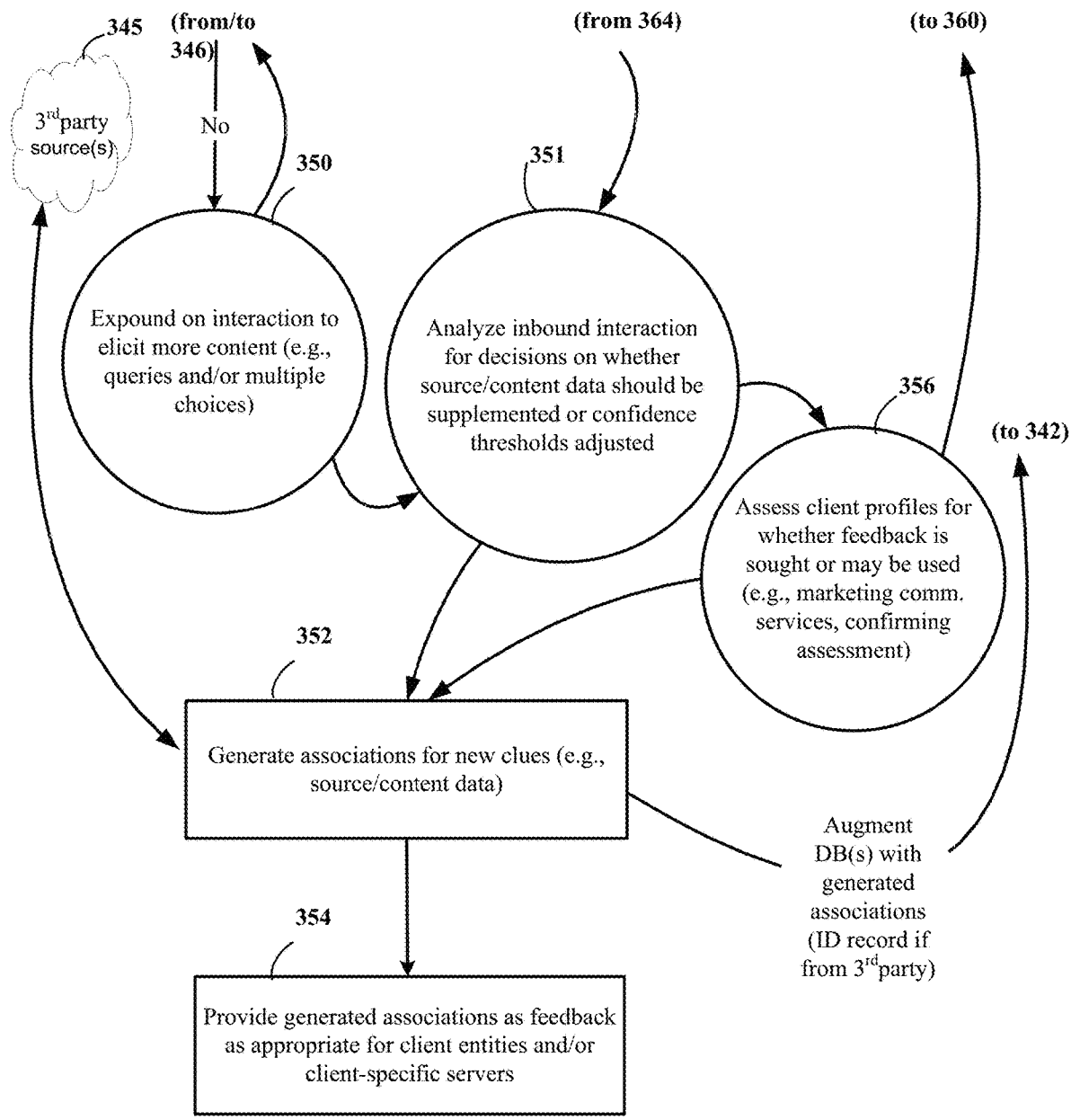

FIGS. 3A and 3B illustrate an example method of one or more of the aspects available to the data-communications system, in accordance with various embodiments of the present disclosure, as may be implemented. In some instances, although the system and related examples are not necessarily so limited, the following discussion of FIGS. 3A-3B assumes that the incoming interaction may involve audio (and/or one or more other forms of digital data) and the system can use aspects of the audio (transcribed speech, voice/video data, intonations, context terms, etc.) for analyzing incoming interactions with previous interactions, for discerning related subject matter between such interactions as may be used for subsequent interactions and/or for providing feedback on such analyses as part of one or more of the data-communications services. Further, an understanding of the exemplary flow of FIGS. 3A-3B may be more readily appreciated with reference to the above provided discussion in connection with FIG. 1A, wherein the UC-CC platform (using data-communications server 110) performs each of the activities as shown in FIGS. 3A-3B.

Beginning at block 340 of FIG. 3A, an incoming interaction is received at processing circuitry of the platform in the form of digital data, for example, which may be indicative of an incoming call, text, etc. Also, the call may be an audio conversation between a plurality of agents and customers of a remotely-situated client entity. The digital data can be voice data transcribed from audio by the endpoint device of the agents and communicated to the processing circuitry and/or the data-communications server via clients on the agent side and the provider side. In other embodiments, a client server can transcribe the digital voice data and communicate the same to the data-communications server, and/or the data-communications server can transcribe communicated audio waves (data).

At block 342 of FIG. 3A, the database may be accessed wherein associations in connection with one or more information sets are checked and/or updated relative to inbound-source and content data (location, caller ID, call-device ID, etc.). At block 343, the digital voice data can be analyzed, via the processing circuitry, for example, also using the database again such as a database of archived data including associations of keywords and/or speech characteristic parameters and outcomes, and/or also using AI/ML trained models. The digital voice data can be analyzed to identify keywords and speech characteristic parameters of the digital voice data, identify outcomes of the respective transcribed audio conversations, generate associations with at least one of the keywords and speech characteristic parameters with the identified outcomes, and/or provide the associations to a client data-communications server as feedback on audio conversations with the customers. If the analysis at block 343 is insufficient and/or more information may be available from one or more $3^{rd}$-party engines (or $3^{rd}$-party analytics packages), attributes of the data communication may be provide to a communication channel which leads to a third party source 345. Permission to convey such attributes to the third party source 345 are subjected to filtering checks via the user profile as discussed above, as depicted at 344a and 344b.

For example, at block 343, the digital voice data is analyzed and used to identify keywords and speech characteristic parameters of the digital voice data and compare the identified keywords and parameters to a database. The database has stored correlations or associations of keywords and parameters to tones or sentiments of a conversation and outcomes of the conversations. The associations or correlations can include a probability of the match indicating the outcome. In response to a match, at block 346, the correlated archived outcomes is identified. In response to no match and/or in addition (can have matching and nonmatching keywords), at block 350 of FIG. 3B, the analysis effort may be expanded such as by identifying other associations based on new keywords, contexts, etc. At 350, the outcome of the respective transcribed audio conversation can be identified, and flow may return to block 346 to assess a match once again.

The outcome, as may be identified based on a match, a respective correlation and/or as based on analysis of metadata in the digital voice data, may lead to block 351 and possibly block 356 as shown in FIG. 3B, where the inbound interaction may be analyzed for deciding on whether source/ content data should be supplemented or confidence thresholds adjusted, and this effort may involve reviewing relevant client profiles (e.g., stored in the database) to discern particular instances in which to perform such adjustments, identify outcomes for metrics to be stored, used and reported, and/or bridge certain agents. From block 352, such newly generated associations are used to augment the database (at block 342) and to provide feedback for certain client entities (e.g., as may be appropriate via the relevant client or client-entity profile in the database(s). Also, a bridge agent can enter metadata that is correlated with the digital voice data and/or that otherwise ties to the transcript, and the metadata can identify the outcome, be used in training AI/ML model(s), and/or be used in augmenting the database and in generating one or more new associations for the database.

Further, as depicted by blocks 342 and 352 of FIGS. 3A and 3B respectively, flow may proceed to block 345 over a pathway (e.g., via a gateway) where information from a third-party source may be requested and/or retrieved for answering a challenge (contestation) in the inbound interaction, supplementing the database with newly generated associations, and/or further training the AI/ML models used by the platform.

Once sufficient analysis is realized, the platform may route the incoming interaction (at block 348 of FIG. 3A) as previously discussed and cause certain actions as indicated block 348 or 360. Such actions may include: the call to be connected to one or more designated call-center agents or specialists; a message to be sent to one or more designated call-center agents or specialists; based on the outcome of the operations at block 346, the call to be associated in a relational database (permanently or temporarily) as a related interaction between the call participants (e.g., Persons A and B); and/or one or more designated call-center agents or specialists to be referred to an initiator/challenger of the incoming interaction.

As contemplated herein, the use of the archived database, in various embodiments, can include one or more CPUs performing artificial intelligence/machine learning (AI/ML) algorithms to determine the outcome. The processing circuitry and/or data-communications server can analyze patterns to identify and associate different keywords, phrases, and/or speech characteristic parameters with particular outcomes, and which can be different for different types of customers (e.g., different geographic regions, fields, sexes, ages, and other categorizations). The processing circuitry and/or data-communications server can analyze resulting data to determine the outcome, such as identifying a sale, retention of a customer, hang-up occurrence, loss of a customer, and resolution of a problem, which can include a specific and identified problem or a general problem, among other outcomes. Overtime, the processing circuitry and/or data-communications server can update the database based on additional digital voice data. For example, at 352, the method includes generating associations with at least one of the keywords and speech characteristic parameters and with the identified outcomes, and storing the associations in information sets relevant to one or more incoming interactions related to the present incoming interaction. The associations can include new keywords that are associated with particular outcomes, new outcomes, and increasing or decreasing a correlation of keywords or parameters with an outcome. For more general information on artificial intelligence and specific information on achieving artificial intelligence, reference to made to U.S. Publication No. 2004/0143559, filed on Jan. 13, 2004, entitled "System and Method for Developing Artificial Intelligence," and U.S. Pat. No. 5,473,732 filed on Feb. 7, 1995, entitled "Relational Artificial Intelligence System," each of which is fully incorporated herein for their teachings.

In specific embodiments, the associations can be classified differently for different types of customers. For example, the processing circuitry can provide different associations based on characteristics of the particular audio conversations, including characteristics selected from the group consisting of: geographic region of the customer, sex of the customer, age of the customer, type of customer, and a combination thereof. The associations are stored in the provider database as an archive that is accessible and that ties the keywords with dates of the conversations and the classifications, and which identifies keywords and phrases to avoid for particular types of customers and keywords and phrases to use for the particular types of customers.

Various advantages of such approaches (e.g., involving the above-described AI/ML methodology, call-load offsetting, and relatively excessive use of resources) are recognizable by one or more of the above examples, and the following example, involving another interaction between the above-exemplified individuals, Persons A and B. Instead of Person A having to put the phone call on hold while activating another communications channel to the data communications system, through which a file for the phone call is requested, by providing to Persons A and B each related file as identified through previous interactions involving Persons A and B, such time and communication/bandwidth resources involved in activating the other communications channel to the data communications system are avoided.

As another specific example, and not intended to be limiting, a first region can include a Northeastern region of the United States and a second region can include a Southern region of the United states. It may be identified that customers from the first region speak at a greater frequency and amplitude than customers from the second region. As another example, it may be identified that women speak at a lower amplitude than men. A third region can include Southern Pacific Coast of the United States (e.g., parts of California) which may include customers that speak at a similar frequency and amplitude as customers from the first region. However, embodiments are not so limited and the above is provided only as an illustrative example. Additionally each of the about may have specific words and phrases to avoid, as they have a greater probability than other words at causing a positive or negative outcome. As a specific example, the second region may have a positive outcome associated with calling the customer "Miss" or "Mr." whereas customers from the third region may have negative outcome associated with the same or may have a greater probability of a positive outcome when addressing customers by their first name.

In various embodiments, feedback can be provided. For example, at block 354, the method further includes providing the associations to a client data-communications server as feedback on audio conversations with the customers. The feedback can be provided to the agent in real time and used by the agent to assist in achieving a positive outcome or to otherwise adjust an outcome of the conversation. Such examples have been discussed such as in the example involve the phone call between Persons A and B, in which the system is to notify Person A and/or Person B of a record of collected previous interactions being available for inspection and/or sharing. In other embodiments, the feedback can be provided after the call is finished and used to train the user. For example, the feedback can be used to train the user in how to handle different situations. In some instances, a report is generated that can be reviewed by a manager, as previous described. Further, in specific embodiments, a manager can be automatically bridged into a VoIP call responsive to particular keywords (e.g., swearing), based on the specific customer, and/or speech characteristics parameters outside a threshold. In such a manner, the feedback can include or otherwise be indicative of customer feedback which is provided to the client entity without actively querying the customer, such as with the customer actively providing answers to a questionnaire.

In a number of related embodiments, the associations between keywords and/or speech characteristic parameters can be adjusted over time. The adjustment can be responsive to different outcomes or input from the agent or other users. For example, the processing circuitry can provide a respective association with at least one of the keywords and speech characteristics with the identified outcome to an agent associated with the audio conversation or to a manager associated with the agent. In a number of embodiments, the associations can be locked and a manager reviews the recommended adjustments (by the agent) and approves or denies the adjustment. In response to the agent or manager providing an input indicating the associated is incorrect, the association is adjusted. In other embodiments and/or in addition, the association can be stored in response to the agent or manager providing an indication that the association is correct, or in response to failing to provide any indication within a threshold period of time.

According to certain implementations and applications, one or more of the above-disclosed example aspects and/or embodiments may be beneficial to CPU-based system operations as provided by at least one, if not multiple aspects which follow. Such a UC-CC communications-service platform is able to provide: AI/ML solutions to difficult-to-discern challenges which apart from aspects of the present disclosure, otherwise would require huge data sets plus constantly evolving technology that cannot be reasonably hosted at scale on premise at any given site; and an ability for users/agents to work from home with digital trunking and/or internet connectivity being highly secure and seamless from the perspective of the users/agents and of others who may be involved or bridged into the call.

Further, the example systems with such UC-CC communications-service platforms according to the present disclosure can provide a reliable call quality under significant loads. Contrary to some known on-premise PBX/call-center systems requiring significant amounts of CPU-based communications equipment and expensively-trained support staff to successfully manage large, especially spiky, call loads on premise, such UC-CC communications-service platforms may readily handle such call loads without such extensive equipment and support staff.

Yet others advantageous points concern the high availability and recovery. The ability to recover from a disaster (e.g., system crash) by such UC-CC communications-service platforms is provided according to the present disclosure. Whereas, an on-premise PBX/CC system does not lend itself to a geographic outage (e.g. lines being cut, weather catastrophe, etc.). Further, such UC-CC communications-service platforms provide a multiple-sourced (e.g., double-sourced) telecommunications service across a PBX system and/or call-center via the UC-CC platform. This point is especially advantageous for organizations without a significant IT budget and/or which cannot manage two or more telecom providers (for redundancy/backup purposes) in a reliable, cost-effective manner. Consider also, the ability of such UC-CC communications-service platforms to handle seasonal bursting of resources as compared to an on-premises PBX/call-center system which is often burdensome and prohibitively expensive.

Additionally as another aspect of the present disclosure, in a system implementation a plurality of such UC-CC communications-service platforms (each according to one or more of the above embodiments of the present disclosure) are deployed redundantly across a mixture of private and/or public data clouds and collectively said plurality of platforms enable such UC-CC platforms to switch in real-time or near real-time (effectively instantly for purposes of system operation from a user's perspective and/or experience) to a redundant platform in the case of any service interruption. This enables services to be provided to the system's end customers seamlessly and/or without interruption. Accordingly, in such a system, the UC-CC platforms may act as redundant subsystems with each such platform being deployed across a plurality of data networks and/or clouds to provide redundancy, and with the plurality of data networks and/or clouds being private and/or public and being configured to enable each of the UC-CC platforms to switch to another one of the UC-CC platforms for redundant real-time or near real-time operation in the case of any event indicative of a possible service interruption.

As another of many advantageous points, such UC-CC communications-service platforms according to the present disclosure are readily configurable to self-provision of software updates and integration of various virtual resources, and if used, with automatic updates of associations in the provider-side database (e.g., 101) and automated training of the AI/ML models to handle future incoming interactions with more-intelligent and increasingly improving outcomes of challenges. This is in contrast to an on-premise system which, although perhaps characterized or thought of as being fully unified, updating the software and ensuring the integration of all systems is functional cannot readily/practicably be done often and therefore may be very challenging and unduly expensive for IT staff to accommodate and more prone to error.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" or "module" (also sometimes "circuit-based module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Various embodiments are implemented in accordance with U.S. patent application (Ser. No. 16/288,270), entitled "Analysis of Digital Voice Data in a Data-Communication Server System," filed Feb. 28, 2019, and which is fully incorporated herein by reference for its teachings. Reference may also be made to the teachings and underlying references provided in this underlying provisional application (Ser. No. 16/288,270).

Similarly, it will be apparent that a server includes a computer processing circuit that is configured to provide data-communications services to other circuit-based devices. Moreover, various other circuit-related terminology is used in a similar context as apparent to the skilled artisan, as is the case with each such apparatus which refers to or includes otherwise known circuit-based structures. As a first example, a (VoIP) endpoint device (or endpoint) includes a communication circuit and (computer) processing circuits which are configured to establish (VoIP) communication sessions with other endpoint devices. The communications circuit can be enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, a processing circuit or circuitry, as provided above, is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in the figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A communications system comprising:
    a unified communications platform (UCP), including at least one data-communications server, to process and route, to one or more user endpoints based on access of data in memory circuitry occurring without traversing a broadband gateway circuit or a security-based firewall circuit, different types of incoming communications respectively using different types of communications channels as part of communications services on behalf a data-communications service provider;
    a channel-communications management circuit (CCMC), including a data-processing computer circuit, to manage in real-time the incoming communications involving the UCP and to merge data ("the merged data") from two or more inbound data communications received via the different types of communications channels into a streamlined-single communication channel, based on input from a graphic user interface (GUI) accessible to a user of the communications services; and
    a processing circuit including a computer circuit, integrated with or coupled to the data-processing computer circuit, communicatively integrated with the CCMC, to
        collect and aggregate information corresponding to digital data carried over the different types of communications channels on behalf of different client entities and customers of the different client entities while blocking certain data deemed sensitive to at least one of the different client entities,
        access the collected and aggregated information, without the certain data, before providing peripheral data concerning the streamlined-single communication channel to the user for review,
        automatically select, based on content from the merged data, one of the different types of communications channels as a channel for which a reply communication is to be sent,
        assess the two or more inbound data communications and in response to provide, as part of the communications services, the peripheral data in the reply communication for review by the user, wherein the peripheral data includes or concerns information related to the merged data, and
        collect attributes from the two or more inbound data communications during a data communications call occurring in real time and identify at least one of the attributes that is common to each of the two or more inbound data communications, and use said at least one of the attributes to prompt generation of the peripheral data and sending of the peripheral data to the GUI for presentation to the user, wherein the processing circuit is further to select the peripheral data concerning the streamlined-single communication channel based on the collected and aggregated information, on a relationship between the streamlined-single communication channel and on a topic in the aggregated information, and in response thereto, to select one of the user endpoints and route one of the incoming communications to the selected one of the user endpoints.

2. The communications system of claim 1, wherein the processing circuit includes an analytics circuit to access a database of different peripheral-data categories or types and to select a subset of the different peripheral-data categories or types for providing the peripheral data concerning the streamlined-single communication channel to the user for review.

3. The communications system of claim 1, wherein the processing circuit includes an analytics circuit to access a database of different types of communications services offered by the UCP and to select a subset of the different types of communications services for providing the peripheral data for review to the user, wherein the peripheral data includes information concerning the subset of the different types of communications services.

4. The communications system of claim 1, wherein the processing circuit includes an analytics circuit to access a database of different peripheral-data categories or types among which at least some include information for identifying third-party resources, and wherein the processing circuit is further to select a subset of the different peripheral-data categories or types and to provide the peripheral data along with a selected one of the identified third-party resources, to the user for review.

5. The communications system of claim 4, wherein the processing circuit is further to assess that the selected one of the identified third-party resources concerns the merged data.

6. The communications system of claim 4, wherein the processing circuit is further to assess that the selected one of the identified third-party resources is deemed more likely than not to concern the merged data, relative to a criteria established in a user profile that is linked to the user.

7. The communications system of claim 1, wherein the processing circuit is further to provide the peripheral data, via the GUI, by using a type of communications channel that is different than the different types of communications channels for use in effecting the streamlined-single communication channel.

8. The communications system of claim 1, wherein the processing circuit is further to provide the peripheral data, via the GUI, by using a type of communications channel that is common to one of the different types of communications channels for use in effecting the streamlined-single communication channel.

9. The communications system of claim 1, wherein the processing circuit is further to: access the collected and aggregated information and in response identify the relationship between the streamlined-single communication channel and the topic in the aggregated information.

10. The communications system of claim 1, wherein the processing circuit is to develop the inbound data communications, as merged, into an interaction record for use in a subsequently-received inbound data communication.

11. The communications system of claim 1, wherein the processing circuit is to develop the inbound data communications, as merged, into an interaction record for the reply communication on a preferred channel.

12. The communications system of claim 1, wherein the GUI is to cause the peripheral data to be presented for review by the user via one of the different types of communications channels corresponding to the different types of communications channels on which the two or more inbound data communications are received.

13. The communications system of claim 1, wherein the processing circuit is to assess a degree to which the peripheral data may be relevant to the received two or more inbound data communications, and, in response, is to select one of a plurality of presentation manners through which the peripheral data is to be presented to the user via the GUI.

14. The communications system of claim 1, wherein the processing circuit is to assess a degree to which the peripheral data may be relevant to the received two or more inbound data communications, and, in response, is to select one of a plurality of presentation manners through which the peripheral data is to be presented to the user via the GUI, wherein the plurality of presentation manners include two or more of the following manners: the peripheral data being presented via: one of the one of the different types of communications channels before being merged, the different types of communications channels after being merged; and a display region separate from the different types of communications channels after being merged.

15. A method comprising:
using a communications platform, including at least one data-communications server, to process and route, to one or more user endpoints based on access of data in memory circuitry occurring without traversing a broadband gateway circuit or a security-based firewall circuit, different types of incoming communications respectively using different types of communications channels as part of communications services on behalf a data-communications service provider and in response to one or more of the incoming communications, collecting and aggregating information corresponding to digital data carried over the different types of communications channels for data communications on behalf of different client entities and customers of the different client entities while blocking certain data deemed sensitive to at least one of the different client entities;
managing in real-time, via a channel-communications management circuit (CCMC) including a data-processing computer circuit, communications involving the communications platform and merging data ("the merged data") of two or more inbound data communications received via the different types of communications channels into a streamlined-single communication channel via a graphic user interface accessible to a user of the communications services; and
via a computer processing circuit, that is communicatively coupled to or integrated with the CCMC, automatically selecting based on content from the merged data one of the different types of communications channels as a channel for which a reply communication is to be sent in response to the merged data and assessing the two or more inbound data communications and in response providing, as part of the communications services, peripheral data in the reply communication for review by the user, wherein the peripheral data concerns or includes information related to the merged data, wherein the computer processing circuit is further to:
select the peripheral data concerning the streamlined-single communication channel based on the collected and aggregated information, on a relationship between the streamlined-single communication channel and on a topic in the collected and aggregated information, and
access the collected and aggregated information, without the certain data, before providing the peripheral data concerning the streamlined-single communication channel to the user for review.

16. The method of claim 15, wherein the channel-communications management circuit merges the inbound data communications received over the different types of communications channels into a unification channel specifically associated with a sender or participant of the inbound data communications, and wherein a preferred one of the different types of communications channels is reacted to by replying to content discerned from at least one of the communications received on the different types of communications channels.

17. The method of claim 15, wherein the channel-communications management circuit is to convey a reaction, associated with the merging, by preparation of a communication based on a determined identity of a sender or participant of an interaction record, and wherein the communications platform is further to send a version of the reply communication to the sender or participant via a correct or preferred one of the different types of communications channels and which correct or preferred one is discerned by the circuitry.

18. The communications system of claim 1, wherein the at least one data-communications server is to monitor and analyze call data relating to one or more of the inbound data communications.

19. The communications system of claim 1, wherein the at least one data-communications server is to monitor and analyze call data relating to multiple ones of the inbound data communications respectively corresponding to different client entities to receive certain of the communications services.

20. A communications system comprising:
a unified communications platform (UCP), including at least one data-communications server, to process and route, to one or more user endpoints based on access of data in memory circuitry occurring without traversing a broadband gateway circuit or a security-based firewall circuit, different types of incoming communications respectively using different types of communications channels as part of communications services on behalf a data-communications service provider;
a channel-communications management circuit (CCMC), including a data-processing computer circuit, to manage in real-time the incoming communications involving the UCP and to merge data ("the merged data") from two or more inbound data communications received via the different types of communications channels into a streamlined-single communication channel, based on input from a graphic user interface (GUI) accessible to a user of the communications services; and
a processing circuit including a computer circuit, integrated with or coupled to the data-processing computer circuit, communicatively integrated with the CCMC, to collect and aggregate information corresponding to digital data carried over the different types of communications channels on behalf of different client entities and customers of the different client entities while blocking certain data deemed sensitive to at least one of the different client entities,
access the collected and aggregated information, without the certain data, before providing peripheral data concerning the streamlined-single communication channel to the user for review,
automatically select, based on content from the merged data, one of the different types of communications channels as a channel for which a reply communication is to be sent,
assess the two or more inbound data communications and in response to provide, as part of the communications services, the peripheral data in the reply communication for review by the user, wherein the peripheral data includes or concerns information related to the merged data, and
collect attributes from the two or more inbound data communications during a data communications call occurring in real time and identify at least one of the attributes that is common to each of the two or more inbound data communications, and use said at least one of the attributes to prompt generation of the peripheral data and sending of the peripheral data to the GUI for presentation to the user, wherein the processing circuit is further to select the peripheral data concerning the streamlined-single communication channel based on the collected and aggregated information, on a relationship between the streamlined-single communication channel and on a topic in the aggregated information, and in response thereto, to select one of the user endpoints and route one of the incoming communications to the selected one of the user endpoints,
wherein the at least one data-communications server is to monitor selectively, on behalf of one or more client entities to receive certain of the communications, customer interactions by agents of the one or more client entities, wherein the customer interactions are monitored selectively based on a data-blocking function linked to privacy issues of certain entities and used to address at least one of: malicious activity and based on the privacy issues of certain entities.

21. The method of claim 15, wherein at least one of the computer processing circuit and the CCMC is to assess and indicate whether the peripheral data concerns or includes information related to the merged data.

* * * * *